(12) United States Patent
Ng-Thow-Hing et al.

(10) Patent No.: US 7,333,111 B2
(45) Date of Patent: Feb. 19, 2008

(54) JOINT COMPONENT FRAMEWORK FOR MODELING COMPLEX JOINT BEHAVIOR

(75) Inventors: Victor Ng-Thow-Hing, Sunnyvale, CA (US); Wei Shao, Astoria, NY (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 309 days.

(21) Appl. No.: 10/425,122

(22) Filed: Apr. 25, 2003

(65) Prior Publication Data

US 2006/0061574 A1 Mar. 23, 2006

(51) Int. Cl.
*G06T 15/70* (2006.01)
(52) U.S. Cl. ............... 345/473; 345/474; 345/475
(58) Field of Classification Search ........... 345/473, 345/474, 475
See application file for complete search history.

(56) References Cited

U.S. PATENT DOCUMENTS

| | | | | |
|---|---|---|---|---|
| 4,600,919 | A | * | 7/1986 | Stern ................. 345/473 |
| 4,797,836 | A | * | 1/1989 | Witek et al. ........... 345/473 |
| 5,267,154 | A | * | 11/1993 | Takeuchi et al. ........ 345/473 |
| 5,427,531 | A | | 6/1995 | Kramer |
| 5,483,630 | A | * | 1/1996 | Unuma et al. .......... 345/475 |
| 5,623,428 | A | * | 4/1997 | Kunii et al. ............ 703/6 |
| 5,692,117 | A | * | 11/1997 | Berend et al. .......... 345/475 |
| 5,835,693 | A | * | 11/1998 | Lynch et al. .......... 345/473 |
| 5,847,716 | A | * | 12/1998 | Hashimoto ............. 345/473 |
| 5,877,778 | A | * | 3/1999 | Dow et al. ............ 345/474 |
| 5,889,532 | A | * | 3/1999 | Boucher et al. ........ 345/473 |
| 5,891,060 | A | | 4/1999 | McGregor et al. |
| 5,912,675 | A | * | 6/1999 | Laperriere ............ 345/473 |
| 5,982,389 | A | * | 11/1999 | Guenter et al. ........ 345/474 |
| 5,990,908 | A | * | 11/1999 | Thingvold ............. 345/474 |
| 6,014,150 | A | * | 1/2000 | Boucher .............. 345/473 |
| 6,057,859 | A | * | 5/2000 | Handelman et al. ...... 345/474 |
| 6,115,053 | A | * | 9/2000 | Perlin ................ 345/475 |
| 6,162,190 | A | | 12/2000 | Kramer |
| 6,166,746 | A | * | 12/2000 | Inada et al. ........... 345/474 |
| 6,353,437 | B1 | * | 3/2002 | Gagne ................ 345/473 |
| 6,400,368 | B1 | * | 6/2002 | Laperriere ........... 345/473 |
| 6,414,684 | B1 | * | 7/2002 | Mochizuki et al. ...... 345/473 |
| 6,628,286 | B1 | * | 9/2003 | Comair et al. ......... 345/473 |
| 6,798,416 | B2 | * | 9/2004 | Lanciault ............ 345/474 |
| 6,947,046 | B2 | * | 9/2005 | Nimura et al. ......... 345/473 |

(Continued)

OTHER PUBLICATIONS

Wilhelms, J.; "Animals with anatomy", IEEEComputer Graphics and Applications, vol. 17, Issue 3, May-Jun. 1997, pp. 22-30.*

(Continued)

*Primary Examiner*—Ulka Chauhan
*Assistant Examiner*—Roberta Prendergast
(74) *Attorney, Agent, or Firm*—Fenwick & West LLP; Mark E. Duell

(57) ABSTRACT

A general joint component framework that is capable of exhibiting complex behaviors of joints in articulated figures is provided. A network of joint components is used to model the kinematics of a joint. A joint builder can specify parameters for each of the joint components and join the joint components to form a joint set function that captures the biomechanical dependencies between the components. The joint function has fewer inputs than the total number of possible articulations yielding both simple control and biomechanically accurate joint movement.

9 Claims, 12 Drawing Sheets

U.S. PATENT DOCUMENTS

2004/0021660 A1* 2/2004 Ng-Thow-Hing et al. .. 345/419
2004/0261501 A1* 12/2004 Ng-Thow-Hing ........... 73/32 R

OTHER PUBLICATIONS

Maurel, et al., "A biomechanical musculoskeletal model of human upper limb for dynamic simulation", 5th IEEE EMBS International Summer School on Biomedical Imaging, Jun. 15-23, 2002, pp. 1-16.*

Lenarcic, et al., "Kinematic design of a humanoid robotic shoulder complex", Proceedings of IEEE International Conference on Robotics and Automation, ICRA '00, vol. 1, Apr. 24-28, 2000, pp. 27-32.*

Sato, Takako, et al., Design and Construction of Human-Body Motion Database Using Bone-Based Human Model, IPSJ Transactions on Databases, Information Processing Society of Japan, Jan. 2001, vol. 42, No. SIG1 (TOD8), pp. 92 to 102, ISSN 0387-5806.

International Search Report for International Application No. PCT/JP2004/005922, Jun. 15, 2004.

Written Opinion of the International Searching Authority for International Application No. PCT/JP2004/005922.

Alias|Wavefront, Installing Maya 4.5 for IRIX, 2002, pp. 1-50, U.S.A.

Craig, J.J., "Introduction to Robotics: Mechanics and Control", 1989, Addison-Wesley, 2 ed., Ch. 3, pp. 68-112.

Kapandji, I.A., "The Physiology of the Joints: Upper Limb", 1982, Churchill Livingstone, 2 ed., vol. 1, pp. 12-13, 20-21, 24-25, 38-41, 46-47, 64-67.

Kapandji, I.A., "The Physiology of the Joints: The Trunk and the Vertebral Column", 1982, Churchill Livingstone, 2 ed., vol. 3, pp. 44-49.

Badler, Norman, et al., "Simulating Humans: Computer Graphics, Animation, and Control,"Oxford University Press, 1999, Philadelphia, PA, U.S.A.

Bull, A. M. J. , et al., "Knee Joint Motion: Description and Measurement", In Proc. Instn. Mech. Engrs., vol. 212 Part H (1998), pp. 357-372.

Delp, Scott L. et al., "A Graphics-Based Software System to Develop and Analyze Models of Musculoskeletal Structures", Computer Biological Medicine, vol. 25, No. 1 (1995), pp. 21-34, Elsevier Science Ltd., Great Britain.

Derose, Tony, et al., "Subdivision Surfaces In Character Animation", In Computer Graphics (SIG-GRAPH 1998 Proceedings), pp. 85-94.

Garner, Brian A., et al., "A Kinematic Model of the Upper Limb Based on the Visible Human Project (VHP) Image Dataset", Computer Methods in Biomechanics and Biomedical Engineering, vol. 2, (1999) pp. 107-124, Overseas Publishers Association, Malaysia.

Girard, Michael, et al., "Computational Modeling for the Computer Animation of Legged Figures", In Computer Graphics (SIGGRAPH 1985 Proceedings), B. A. Barsky, Ed., vol. 19, No. 3, pp. 263-270, San Francisco, CA, U.S.A.

Grassia, F. Sebastian, "Practical parameterization of Rotations Using the Exponential Map", Journal of Graphics Tools, vol. 3, No. 3 (1998), pp. 29-48, A.K. Peters Ltd.

Hodgins, Jessica K., et al., "Perception of Human Motion With Different Geometric Models," IEEE Transactions on Visualization and Computer Graphics, vol. 4, No. 4 (Oct.-Dec. 1998), pp. 307-316.

Lewis, J. P., et al., "Pose Space Deformation: A Unified Approach to Shape Interpolation and Skeleton-Driven Deformation," In Computer Graphics (SIGGRAPH 2000 Proceedings), pp. 165-172, New Orleans, LA, U.S.A.

Maciel, Anderson, et al. "Anatomy-based Joint Models for Virtual Humans Skeletons", In Proceedings of Computer Animation (2002), pp. 220-224.

Maurel, Walter, et al., "Human Shoulder Modeling Including Scapulo-Thoracic Constraint and Joint Sinus Cones," Computers and Graphics vol. 24, No. 2 (2000), pp. 203-218.

Monheit, Gary, et al., "A Kinematic Model of the Human Spine and Torso," IEEE Computer Graphics and Applications, vol. 11, No. 2 (Mar. 1991), pp. 29-38.

Scheepers, Ferdi, et al., "Anatomy-Based Modeling of the Human Musculature," In Computer Graphics (SIGGRAPH 1997 Proceedings), pp. 163-172.

Shoemake, Ken, et al., "Matrix Animation and Polar Decomposition," In Proceedings of Graphics Interface 1992, pp. 258-264.

Shoemake, Ken, "Animation Rotation with Quaternion Curves", In Computer Graphics (SIGGRAPH 1985 Proceedings), vol. 19, No. 3 (ACM 1985), pp. 245-254.

Sloan, Peter-Pike J., et al., "Shape by Example", In Proceedings of the 2001 Symposium on Interactive 3D Graphics, pp. 135-143.

Humanoid Animation Working Group, "Specification for a Standard Humanoid", Version 1.1, [online], [Retrieved on Apr. 23, 2003]. Retrieved from the internet: <http://www.h-anim.org/Specifications/H-Anim1.1/>, pp. 1-17.

Tost, D., et al., "Human Body Animation: A Survey", SIGGRAPH '88 Proceedings, The Visual Computer, vol. 3, No. 5 (1988), pp. 12-22.

Wilhelms, Jane, et al., "Anatomically Based Modeling", In Computer Graphics (SIGGRAPH '97 Proceedings) (1997), pp. 173-180.

Wilhelms, Jane, et al., "Efficient Spherical Joint Limits With Reach Cones", Apr. 17, 2001, University of California, Santa Cruz, CA, U.S.A., pp. 1-13.

Wilhelms, Jane, et al:, "Fast and Easy Reach-Cone Joint Limits", vol. 6, No. 2 (2001), pp. 27-41, A.K. Peters Ltd.

Wang, Xiaohuan Corina, et al., "Multi-Weight Enveloping: Least-Squares Approximation Techniques for Skin Animation", In 2002. ACM SIGGRAPH Symposium on Computer Animation, pp. 129-138.

* cited by examiner

JOINT COMPONENT FRAMEWORK FOR MODELING COMPLEX JOINT BEHAVIOR

TECHNICAL FIELD

This invention relates generally to joint modeling, and more particularly, to a component framework that offers complex articulation and biomechanical accuracy for representing joints.

BACKGROUND

Accurate representation of skeletal articulations is important for many applications including biomechanics and computer graphics. In biomechanics, for example, accurate joint models can be used for injury prevention and rehabilitation. For computer graphics, accurate joint models can lead to improved realism in character animation.

One conventional approach for representing human characters with an articulated joint model uses the Denavit-Hartenberg link parameter notation from robotics to represent figures with articulated limbs. One such conventional system is described in M. Girard et al., "Computational modeling for the computer animation of legged figures," Computer Graphics (SIGGRAPH '85 Proceedings), vol. 19, pp. 263-270, 1985, which is incorporated by reference herein in its entirety. Although the parameter notation relates coordinate frames between adjacent segments with four parameters, each parameter set describes only a single degree of freedom between two segments. Multiple sets of parameters can be combined to achieve multiple degree of freedom (DOF) joints, but additional complexity is added for the user to manipulate or to make use of the resulting joint expressions.

Other conventional approaches include the use of Euler angles to express segment orientations, as well as quaternions and exponential maps that have desirable interpolation properties and avoid singularities inherent with Euler angles. Euler angles have degrees of freedom that are natural analogs to motion descriptions such as twist, flexion-extension, and abduction-adduction in human movement. One disadvantage of Euler angles, however, is that the choice of parameterization is restricted for particular orientations.

In addition, specialized or specifically targeted models are conventionally used to represent complex biomechanical characteristics associated with particular types of joints. Physiological joints have been shown to have many complexities that are often neglected in graphical models. For example, biomechanists routinely specify joints with several non-orthogonal, arbitrary axes of rotation that are better aligned to bone articulation. Many joints have translational components and changing centers of rotation, including the knee that is traditionally simplified as a single DOF hinge joint. In joints like the shoulder, the closed loop consisting of the clavicle, scapula, and thoracic surface of the rib cage creates a coupling between the articulations of all these joints. Several conventional approaches model, this situation by enforcing a constraint on the scapula to stay on the surface of an ellipsoid approximating the rib cage. Techniques that use specialized models to represent biomechanical or physiological complexity can be difficult for users to configure and to control.

Further, the majority of commercial software that provides visualization features for three-dimensional (3-D) modeling does not support the complexity of multiple DOF joints or specialized models. The motion of a single joint is generally restricted to the relative motion between two adjacent segments, rather than a coordinated set of motions over several segments.

One example of a system that lacks coordination over several segments is described in A. Maciel et al., "Anatomy-based joint models for virtual human skeletons," Proceedings of Computer Animation 2002, pp. 165-172. Maciel et al. describes a model that incorporates joints that can translate and rotate together on a plane and have joint limits that dynamically change with the DOF of any joint. Each DOF is associated with an axis of rotation or translation for a single segment.

Other conventional approaches lack the generality needed to include changing joint centers, surface constraints, and joint sinus cones for joint limits on ball-and-socket joints. For example, the Peabody system described in N. Badler et al., "Virtual humans and simulated agents," Oxford University Press, 1992, which is incorporated by reference herein in its entirety, collects joints into joint groups that have group angles to configure the joint group's segments, but lacks this generality. One problem with conventional systems that provide a high level organization to coordinate individual joints is that they are not sufficiently generalized to represent all joints accurately.

Another problem with conventional systems is that joint models are not easily exchanged or interchanged among software environments. Although standardized humanoid joint hierarchy have been defined for the purpose of avatar representation, custom joints can be added only if they do not interfere with the movement of the standard joints. Although a standard human representation is important for avatar exchange and compatibility in different software, the flexibility to define new coordinated articulations is hampered by constraints enforced by the hierarchy.

What is needed is a joint component model framework that provides modeling of joint expressions over several bone segments and provides a high level organization to coordinate the joint components. What is further needed is a framework that accommodates biomechanically accurate joints with non-orthogonal rotation axes, changing joint centers, closed loops, and intuitive configuration parameters and controls. What is additionally needed is a framework that includes intuitive controls and that provides for exchange or interchange among software environments.

SUMMARY OF THE INVENTION

One embodiment of the present invention provides a general joint component model that is exhibiting complex behavior of joints in articulated figures. The joint components are defined as a mapping of inputs to outputs that are controlled by a list of parameters. The parameters configure the joint component to describe specific features such as joint limits and axes of rotation. The joint components are modular, reusable building blocks that can be combined together in a network to implement a joint set function. Further, the joint components are capable of handling non-orthogonal, non-intersecting axes of rotation, and changing joint centers that are often found in the kinematics of real anatomical joints.

In one embodiment of the present invention, generalized coordinates are provided as input to the joint set function. The generalized coordinates represent the degrees of freedom (DOF) of the joint set function and are used to adjust the joint articulation. The joint set function produces output transformation matrices that are used to animate the bone segments. Various linear and nonlinear joint dependencies are made implicit within the framework. Therefore, the adjustment of joint articulation is done with a relatively small set of intuitive parameters compared to the number of articulations in the motions they parameterize.

In another embodiment of the present invention, the inputs to the joint set function can be designed to have intuitive interpretations to a user such as an animator, and be sufficiently compact because the dependencies and the coupling of the joints are implicitly built into the joint set function. Joint components can be reused in different contexts or extended to incorporate increasing accuracy in the joint model.

In a further embodiment of the present invention, a method for building a joint set function for a target joint is provided. One embodiment of the method includes identifying bones and articulations in the target joint, partitioning the bones and articulations into bone groups, choosing a bone group, and selecting joint components to model the articulations for the chosen bone group. Each joint component includes at least one parameter. The method further includes setting the parameter of each joint component to define the behavior of the joint component, and coupling the joint components into a network to produce the joint set function.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

Figure 1:
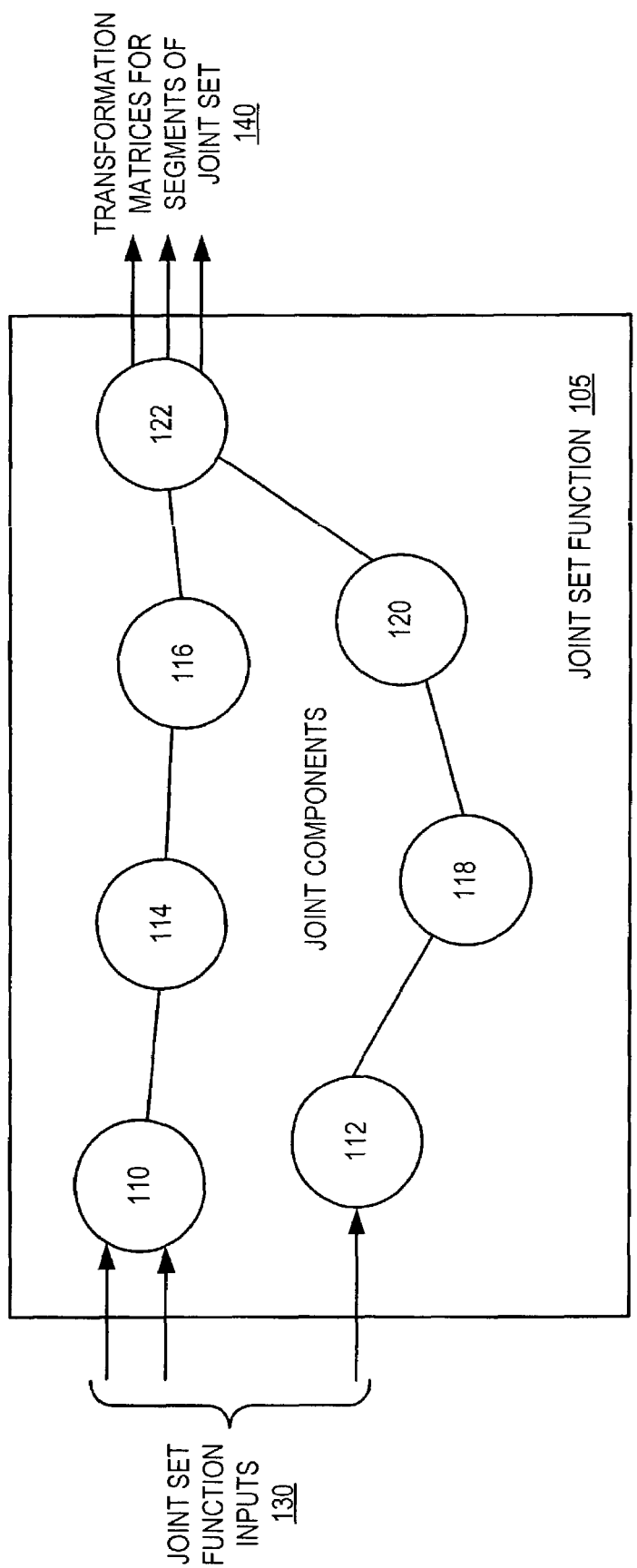
FIG. 1 is a diagram of a joint component model according to one embodiment of the present invention.

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

In computer graphics applications, realistic depiction and animation of human characters is an important element contributing to the appeal and success of interactive graphics. Three-dimensional humanoids are often the physical embodiment of the interactive interface, either serving as an avatar for the player, or as representations of other autonomous characters in the virtual environment. While recent research has focused on better geometric representations, anatomy-based modeling, and pose-based skin deformation for representing and animating the exterior skin and muscle deformations of humans, the underlying articulated body representation that drives these methods has generally been unchanged since its first use in computer animation in the 1980s.

Introducing accurate biomechanical joint models to the traditional hierarchy of joint transformations can lead to improved realism in human character animation. Interactive applications such as 3-D computer games and virtual reality have benefited from improvements in graphics hardware by depicting humanoid characters with greater levels of detail in their geometric surface models. However, studies in perception of human motion with different geometric models have suggested that observers may be more sensitive to motion changes if polygonal models are used compared to stick figures. As the majority of 3-D interactive applications use polygonal models with increasing detail, observers may be more sensitive to noticing unrealistic joint motions in animations, such as in the shoulder and torso regions of the body. This is especially relevant to sport simulations where perceived athleticism is tied to the coordination of movement in virtual human players. For animation techniques that deform an outer skin model based on skeleton motion, accurate joint transformations of bone segments can lead to better performance of these methods by improving the association between skin movement and the underlying bones in the case of pose-based deformations and modeling more accurate muscle deformations in response to skeletal movement in the case of anatomy-based models.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices (e.g., cellular handsets/radiotelephones).

The program instructions can be distributed on a computer readable medium or storage volume. The computer readable storage volume can be available via a public network, a private network, or the Internet. Program instructions can be in any appropriate form, such as source code, object code, or scripting code.

A. System Overview

The illustrated embodiment includes a joint set function 105. The joint set function 105 includes a number of joint components 110, 112, 114, 116, 118, 120, 122, joint set function inputs 130, and output transformation matrices 140. Each of the joint components 110, 112, 114, 116, 118, 120, 122 is a mapping that takes a set of inputs to produce outputs that can be attached to other components in the framework. The joint components 110, 112, 114, 116, 118, 120, 122 are configured into a network that forms the joint set function 105. The network of joint components 110, 112, 114, 116, 118, 120, 122 produces the output transformation matrices 140 that correspond to the transformations of individual bone segments.

The joint set function inputs 130 correspond to the set of parameters that user modifies to control the articulation of the model. One example user of the joint set function 105 is an animator, although one skilled in the art will appreciate that programmatic methods can be used to provide joint set function inputs 130. One such programmatic method is a conventional animation algorithm.

One advantage of the joint set function 105 is that the complexity of the joint components 110, 112, 114, 116, 118, 120, 122 is hidden from the user. That is, the joint set function inputs 130 can be a set of intuitively designed parameters that effectively control complex articulations of the subject. Further features and examples of constructing models for particular joints are described below.

B. Joint Component Model

For clarity of the following description, some terminology and notation is now described. An articulated figure includes a set of segments s that can express only rigid body motion. The segments are related to each other by a hierarchy where the motion of segment s is expressed relative to its parent p in the form of a 4×4 transformation matrix $_s^pT$ (the superscript p can be removed when the parent segment is not referenced). A segment can have no parent, $_s^0T$, implying that its motion is relative to the world coordinate frame. The segments of a single articulated figure can be partitioned, therefore, into several hierarchical trees. This can be useful if an articulated figure contains free-floating segments.

Figure 2:
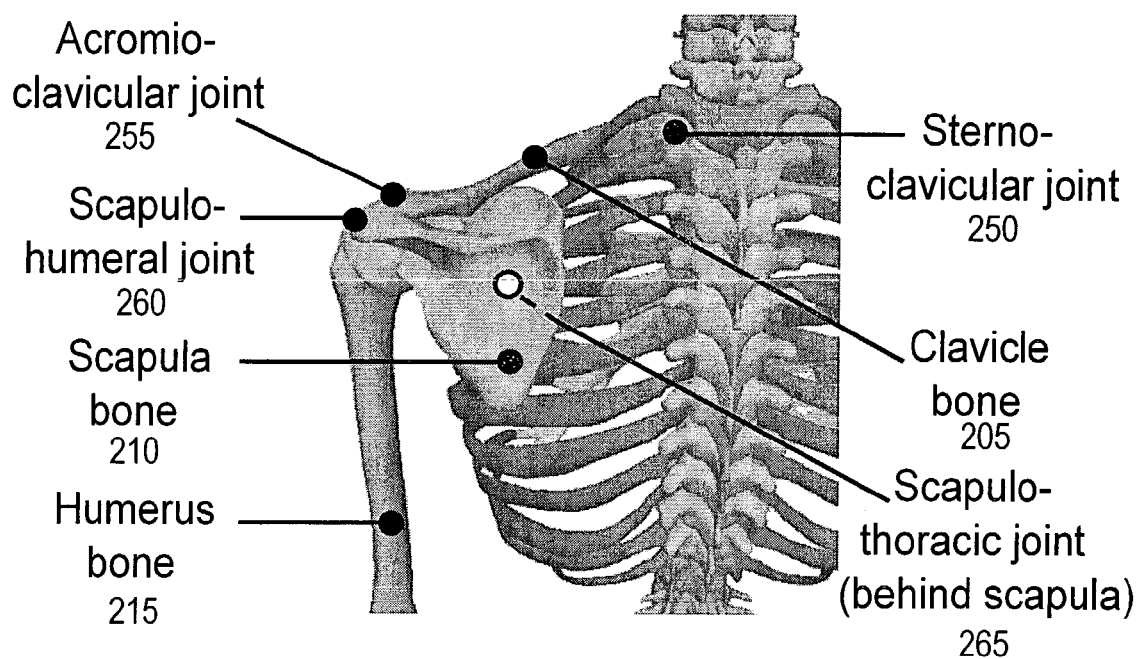
FIG. 2 illustrates a shoulder joint set in accordance with one embodiment of the present invention.

A joint set J contains one or more segments whose configuration is described by independent degrees of freedom (DOF) or generalized coordinates (GC), $q_J$. For each segment in the joint set, its relative motion with its parent is described as an articulation or joint. FIG. 2 illustrates a shoulder joint set in accordance with one embodiment of the present invention. For example, as shown in FIG. 2, the shoulder joint set includes four bone segments: a clavicle bone 205, a scapula bone 210, a thorax (not shown) and a humerus bone 215. The shoulder joint set also includes four articulations: a sterno-clavicular joint 250, an acromio-clavicular joint 255, a scapulo-humeral joint 260 and a scapulo-thoracic joint 265. In one embodiment of the present invention, segments do not have to be adjacent to each other within a joint set, implying a segment's parent can reside in a different joint set.

Mathematically, the transformation matrix for each segment's joint in J is expressed as a changing transformation matrix function, $_sT(q_J)$. For each joint set J, the joint set function 105 can be defined as a mapping of its generalized coordinates (i.e., joint set function inputs 130) to the transformation matrix functions for each segment 140. Expression 1 represents one definition of the joint set function 105.

$$f_J:\{q_J\} \to \{_sT s \in J\} \quad (1)$$

By partitioning the motion of segments of an articulated figure into several joint sets, one can control complex articulations kinematically with only a few DOFs. As described in further detail below, for example, a 24 vertebrae human spine can be implemented using three joint sets for the cervical, thoracic and lumbar regions, with each region having three DOFs for flexion/extension, side-bending and axial twisting.

According to one embodiment of the present invention, joint components 110, 112, 114, 116, 118, 120, 122 are modular, reusable building blocks that implement the joint set function 105. Each joint component 110, 112, 114, 116, 118, 120, 122 implements a cohesive function, facilitating its reuse in different contexts. The joint component 110, 112, 114, 116, 118, 120, 122 is defined in Expression 2 as a mapping where Λ is a list of parameters that configure a joint component to describe specific features such as joint limits and axes of rotation.

$$j_{79}:\Theta \to \Omega, \quad (2)$$

The sets, $\Theta$ and $\Omega$ can have scalar, vector, or matrix elements and correspond to the inputs and outputs of the joint component, $j_{79}$ respectively. The joint set function 105 includes a network of joint components 110, 112, 114, 116, 118, 120, 122 that is created by connecting the output(s) of one component to the input(s) of one or more other components. In another embodiment of the present invention, the joint set function 105 (and/or corresponding network) includes a single joint component 110, 112, 114, 116, 118, 120, 122. Generalized coordinates, such as joint set function inputs 130, feed into the network with transformation matrices for segments 140 produced as output. In one embodiment of the present invention, a relatively small number of simple joint components 110, 112, 114, 116, 118, 120, 122 can be combined to create a diverse array of behaviors. This framework allows new types of joint components 110, 112, 114, 116, 118, 120, 122 to be added and used with existing components with minimal coupling between modules.

C. Joint Components

Several specific examples of joint components 110, 112, 114, 116, 118, 120, 122 are described below. One skilled in the art will appreciate that one feature of the present invention is generalized, flexible representation of a network of joint components 110, 112, 114, 116, 118, 120, 122. Therefore, it is noted that joint components other than those described below can be added to one embodiment of the present invention. Also the joint components 110, 112, 114, 116, 118, 120, 122 can be modified to include additional features or functions not specifically described herein.

1. Matrix Multiplication Component

A matrix multiplication component takes as input a list of several matrices and multiplies them together to produce a single transformation matrix as output. The order of elements in the list determines the multiplication order. The output can either be the final transformation that will be applied to the corresponding joint (e.g., transformation matrix 140) or an intermediate result that will be used as input to other joint components 110, 112, 114, 116, 118, 120, 122.

One skilled in the art will recognize that mathematical operation of the matrix multiplication component is a conventional matrix multiplication procedure. As further described in K. Shoemake et al., "Matrix animation and polar decomposition," Proceedings of Graphics Interface 1992, pp. 258-264, which is incorporated by reference herein in its entirety, many transformations can be expressed as matrix decompositions with intuitive parameters for the user.

2. One-to-Many Mapping Component

A one-to-many mapping component has a single scalar input and produces a vector of one or more joint variables, which can be interpreted as angles or translational units for revolute or translational joints. This mechanism allows a single scalar DOF to control the articulations of more than one joint. For example, in one embodiment of the present invention, a knee model can be implemented where a single generalized coordinate is the common parameter of several cubic spline functions that evaluate the Euler angle rotations and translations for the patella, fibula and tibia bones. As one skilled in the art will appreciate, non-linear piecewise cubic spline functions are beneficial for producing smooth motion.

Within the one-to-many mapping component, each element of the output vector can have its own linear or nonlinear function in its connection from the input scalar. These functions can implement different rates of change for several joint variables, unit conversions, and joint limits for one or more joints. For example, the domain [0,1] can be mapped to the limits [$\theta_{min}$, $\theta_{max}$] for a rotation angle $\theta$.

3. Compensation Component

In a conventional hierarchical skeleton tree, the transformations of a parent segment are inherited by the child segment. However, this may produce undesirable behavior in some situations. For instance, if one wants to shrug the shoulders of a human model, the rotation in the clavicle 205 would propagate to the humerus 215, causing the humerus 215 to rotate away from the body. A user or animator may want to keep the orientations of the humerus 215 and clavicle 205 independent.

Conventional compensation components are designed to apply a corrective angle rotation that compensates for the parent's propagated rotation. In one embodiment of the present invention, the compensation component generalizes this concept to cancel out the orientation transformation (created by any rotation parameterization) of any ancestor segment (not just the direct parent) for a particular segment while maintaining connectivity at the joint with its segment by adjusting the translation of the segment. This allows a segment to have orientation with respect to the world frame.

The compensation component for a particular segment s takes as input a single transformation matrix of an ancestor segment and produces a matrix that cancels out the undesired orientation change caused by the rotation of that ancestor. Depending on how far up the skeleton hierarchy tree we wish to cancel out orientations, a segment can have a compensation component for each ancestor. The outputs of each compensation component are then multiplied using the matrix multiplication component to produce a matrix that compensates for all the undesired movements caused by a segment's ancestors up to a certain level in the skeleton tree. In the shoulder joint set illustrated in FIG. 2, two compensation components are used to create an independent humerus 215 orientation from the scapula 210 and clavicle 205 rotation. The first component cancels the effects of the acromio-clavicular joint 255 (which connects the scapula 210 to the clavicle 205), and the second component nullifies the sterno-clavicular joint 250 (which connects the clavicle 205 to the sternum of the rib cage).

Figure 3:
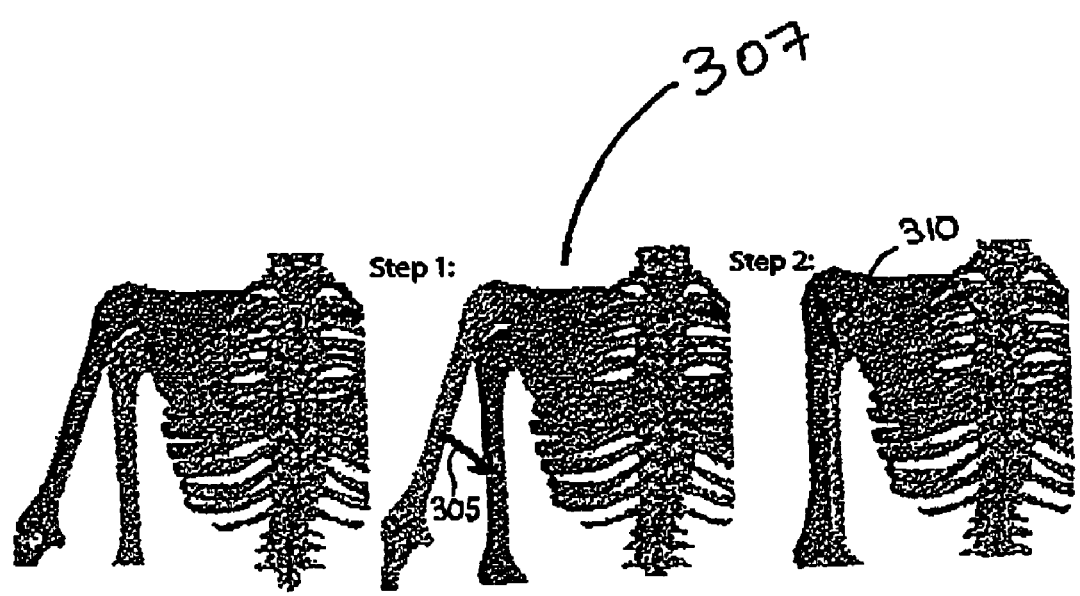
FIG. 3 illustrates a compensation component according to one embodiment of the present invention.

In one embodiment of the present invention, the computation of the compensation matrix is done in two steps. FIG. 3 illustrates a compensation component according to one embodiment of the present invention. As shown in FIG. 3, first, the inverse of the ancestor segment's transformation matrix is computed to cancel out its movement. At this stage, the segment has moved back to its original position and orientation (as indicated by arrow 305) before any of the ancestor transformations have been applied. The segment now has to be reconnected to the same coincident joint location it shared with its parent. In the second step, a corrective translation (as indicated by arrow 310) is calculated as the displacement of the segment's local origin caused by the ancestor's transformation matrix.

More specifically, the scapula 210, which is the parent of the humerus 215, is itself a child of the clavicle 205. In FIG. 3, the clavicle 205 rotates from its reference position (shown in light gray), to a new configuration (shown in dark gray). The first step of applying the inverse transformations of the scapula 210 and the clavicle 205 to the humerus 215 results in the configuration shown in the image 307. The humerus 215 is now disjointed from the scapula 210. In the second step, a corrective translation is applied (as indicated by arrow 310) to the humerus 215 to reunite it with the scapula 210.

4. Rotation Component

In one embodiment of the present invention, the rotation component can be designed to accommodate non-orthogonal, arbitrary axes of rotation with changing joint centers that are a function of generalized coordinate values. Joints with multiple DOF rotations can be created by combining rotation components, each of which produces a rotation matrix for a single axis rotation. One skilled in the art will recognize that it is assumed that the joint centers for each axis rotation are independent of the rotations about the other axes. The rotation component includes the following parameters: (1) a list of n consecutive angle intervals: [$a_0$, $a_1$), [$a_1$, $a_2$), . . . , [$a_{n-1}$, $a_n$]; (2) for each angle interval [$a_{i-1}$, $a_i$), a rotation center point $c_i$=<$c_x$, $c_y$, $c_z$>; and (3) a common rotation axis x.

In one embodiment of the present invention, each angle interval can have a different joint rotation center. The ability to model a changing joint rotation center is important to describe rotations accurately in the several joints including the knee and the humerus of the shoulder. Of course, a single angle interval (and corresponding joint center) can also be defined for a rotation component. With these rotation parameters and an input rotation angle $\alpha \in [a_0, a_n]$ (which can be derived from the output of other joint components), the final output rotation matrix R for the joint component is computed as defined in Expressions 3 where R, $M_i$, $T_i$, $T_i^{-1}$, and $Q_i$ are all transformation matrices. $Q_i$ is computed from a quaternion representing the rotation of angle $\beta_i$ around axis x.

$$R = M_n \times M_{n-1} \times \ldots \times M_1 \qquad (3)$$

$$M_i = T_i^{-1} \times Q_i \times T_i$$

$$T_i = \begin{pmatrix} 1 & 0 & 0 & -c_x \\ 0 & 1 & 0 & -c_y \\ 0 & 0 & 1 & -c_z \\ 0 & 0 & 0 & 1 \end{pmatrix}$$

$$T_i^{-1} = \begin{pmatrix} 1 & 0 & 0 & c_x \\ 0 & 1 & 0 & c_y \\ 0 & 0 & 1 & c_z \\ 0 & 0 & 0 & 1 \end{pmatrix}.$$

The angle $\beta_i$ is determined by Expression 4. The final rotation of the angle $\alpha$ is the cumulative result of a sequence of quaternion rotations of smaller angles $\beta_i$. Each of these quaternion rotations has its own center represented in the $T_i$ and $T_i^{-1}$ translation matrices. This is one implementation of a changing joint rotation center of a joint in accordance with one embodiment of the present invention.

$$\beta_i = \begin{cases} a_i - a_{i-1} & \text{if } \alpha > a_i \\ \alpha - a_i & \text{if } a_{i-1} < \alpha < a_i \\ 0 & \text{otherwise} \end{cases} \quad (4)$$

Figure 4:
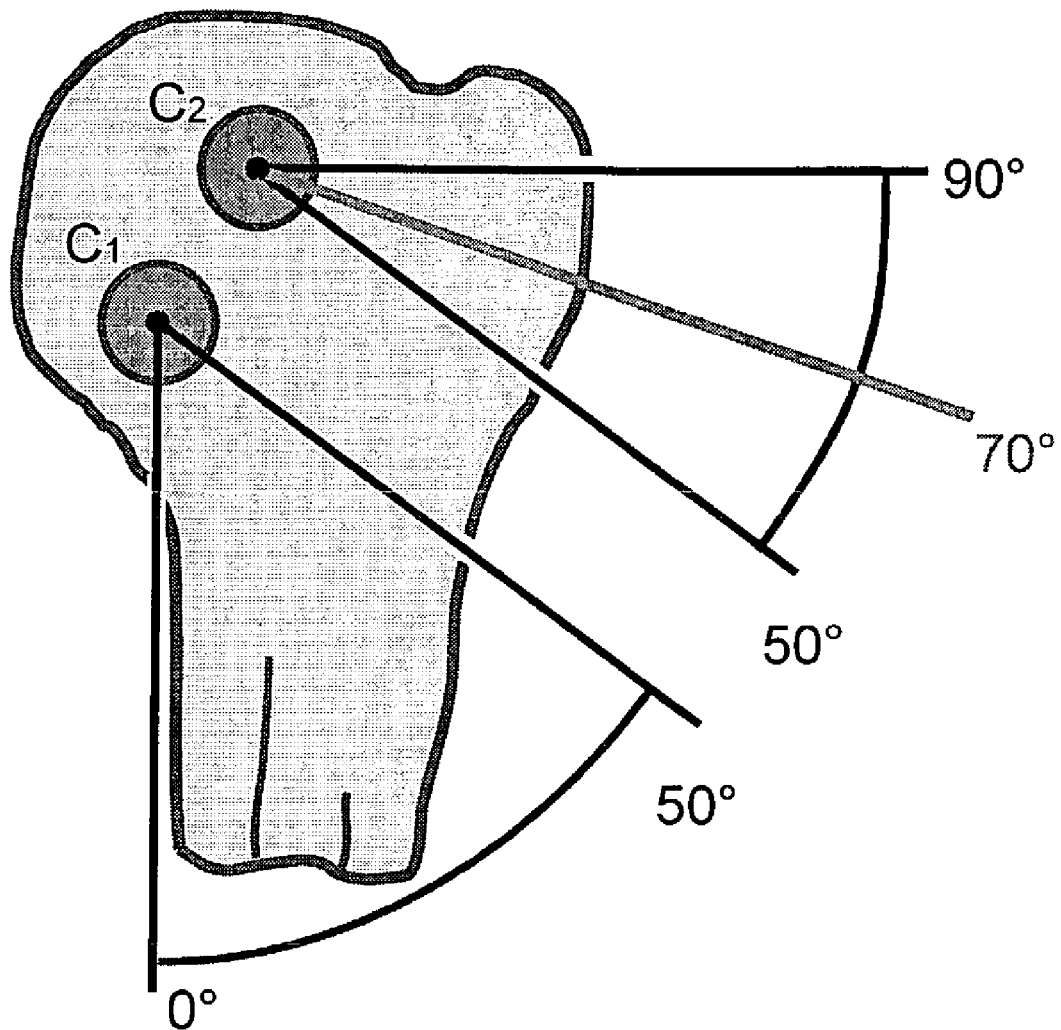
FIG. 4 is a diagram illustrating changing joint centers according to one embodiment of the present invention.
Figure 5:
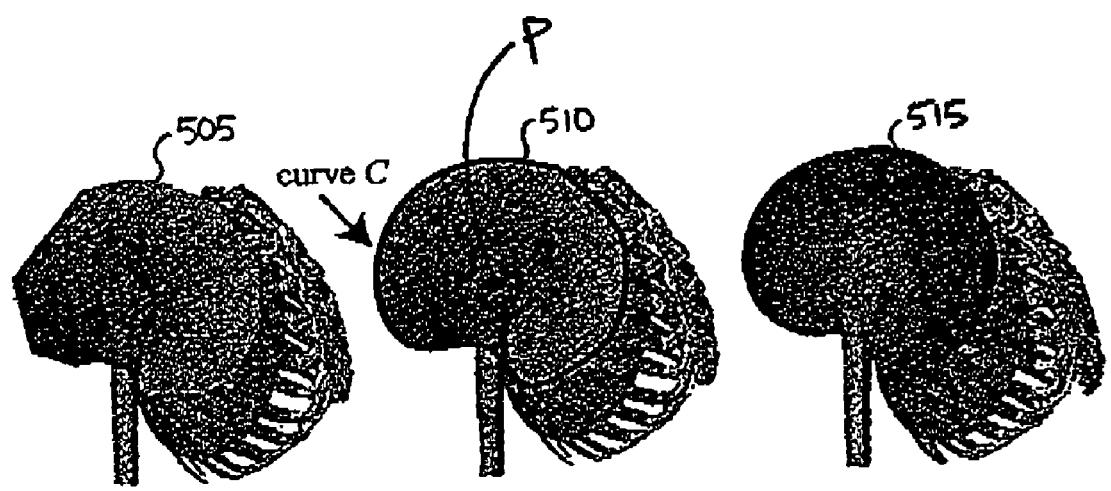
FIG. 5 is a diagram illustrating a joint limit cone according to one embodiment of the present invention.
Figure 6:
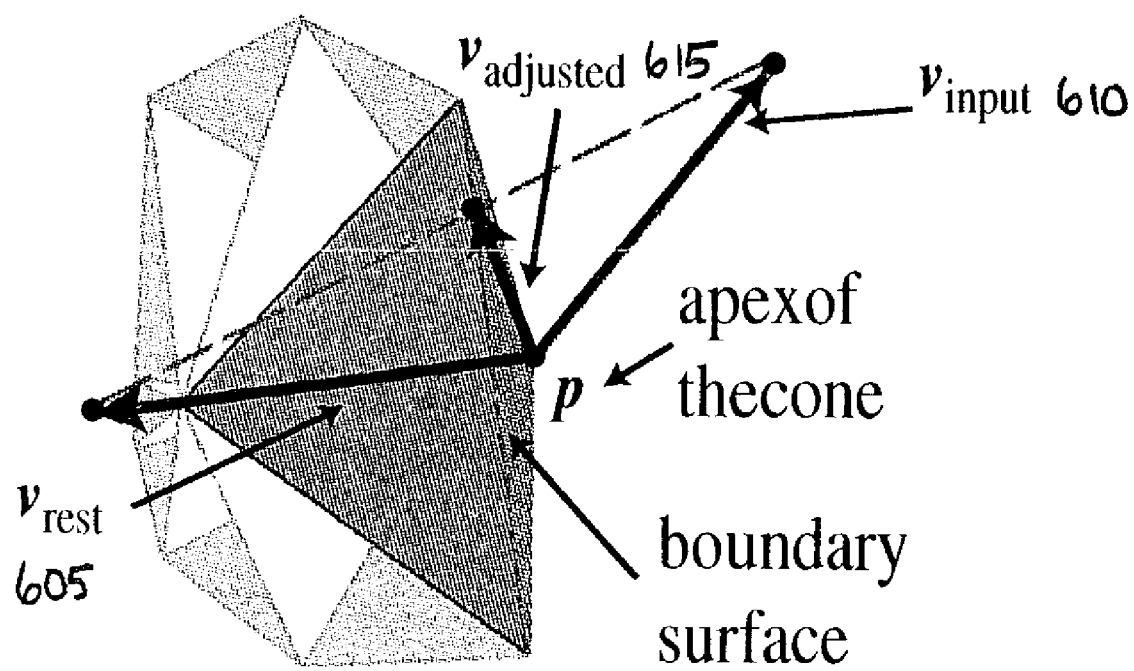
FIG. 6 is a diagram illustrating a joint cone projection according to one embodiment of the present invention.

FIG. 4 is a diagram illustrating changing joint centers according to one embodiment of the present invention. In the example illustrated in FIG. 4, abduction of the upper arm takes $c_1$ as rotation center during 0 to 50 degrees and takes $c_2$ during 50 to 90 degrees of rotation. More specifically, for an abduction angle of 70 degrees, first a 50 degree rotation is performed around $c_1$, and the remaining 20 degrees use $c_2$ as the rotational center.

One skilled in the art will note that for a given α that falls into a certain interval $[a_{j-1}, a_j)$, all $M_k$ (0<k<j) will not depend on α since each of their $\beta_k$ is a constant equal to $a_k - a_{k-1}$. The matrices $M_k$ can be precomputed and stored for the full angle interval rotation to reduce real-time computation demands. Furthermore, the cumulative matrix product R in Equation 1 for the $j^{th}$ interval can have $M_{j-1} \times M_{j-2} \times \ldots \times M_1$ precomputed and retrieved to update the articulated figure motion at interactive rates.

5. Dependency Component

The dependency component allows the modeling of coupling behavior between different joints within a joint set function 105. In each dependency component, a pair of joints are specified, one as the active joint a that drives the other passive joint p. The movement of a DOF of p is set to be dependent on a DOF of a through a mapping function. The actual nature of the mapping function used in the dependency component can be any linear or nonlinear function. Interpolating splines are often convenient to match dependency relations to experimental data samples. In one embodiment of the present invention, the DOF corresponds to Euler angles that define the rotation matrix of each joint. The dependency component takes two input Euler angles, one from each joint, and contains a mapping function to output a modified angle for the passive joint. Several types of mapping relationships can be implemented, including (1) one-to-one mapping; (2) one-sided bound mapping; and (3) two-sided bound mapping.

a) One-to-one Mapping

For any given DOF value of a, a DOF value for p is defined. For instance, the rotation of the scapula around an axis perpendicular to its outward surface tangent plane is almost linearly dependent on the abduction of upper arm. A linear one-to-one mapping can capture this relationship.

b) One-sided Bound Mapping

One-sided bound mapping is a one-to-one map where values of p are bounded on one side by a lower or upper limit that is a function of a DOF of a. An example of this is the dependency between the abduction of the humerus 215 and the elevation of the clavicle 205. The higher the upper arm is raised, the more restricted is the vertical movement of the shoulder's clavicle. The restriction is due to a lower limit placed on clavicle 205 elevation, which can be implemented as a one-sided bound that is dependent on the amount of abduction of the humerus 215.

c) Two-sided Bound Mapping

The value of a DOF of p is bounded on both sides by limits dependent on a DOF of a. Again using the shoulder as an example, when the left upper arm is rotating in the horizontal plane from the left side to the front right of the body, the horizontal movement of the shoulder (at the clavicle bone 205) becomes more restricted. A similar phenomenon occurs when the left upper arm is rotating to the back of the body. Because there are both upper and lower limits, a two-sided mapping is appropriate in this example case.

6. Joint Cone Component

Joint sinus cones have been conventionally used to provide a better mechanism for joint limits for ball-and-socket joints than pairs of Euler angle bounds for each joint DOF. Further details of conventional joint sinus cones are described in W. Maurel et al., "Human shoulder modeling including scapulo-thoracic constraint and joint sinus cones," Computers and Graphics, vol. 24, no. 2, pp. 203-218, 2000, which is incorporated by reference herein in its entirety.

In the illustrated embodiment, a joint sinus cone 505, 510, 515 is extended to accommodate changing joint centers that can occur with rotation component described above. In a joint cone component the joint sinus cone 505, 510, 515 is defined using a reference point p and a space curve C. The reference point p is the apex of the cone and is located at the joint center. The curve C creates a boundary of the bottom of the cone and is defined by an initial list of user-selected control points. For example, joint sinus cone 505 uses 14 points to define the curve C.

Subdivision rules can be used to refine and smooth the curve. For example, joint sinus cone 510 represents a refined and smoothed version of joint sinus cone 505. An additional vector $v_{rest}$ is defined and positioned at p so that it lies in the same direction as the bone's longitudinal axis at its rest configuration. This cone provides a way of bounding the movements of two DOF of a joint, such as abduction/adduction and flexion/extension in the humerus 215 at the shoulder. To limit the third twist DOF, an additional pair of angle bounds is associated with each control point on the curve C and the point $v_{rest}$. During the refinement process, new interpolated bound pairs are computed for the new control points produced by subdivision. In one embodiment of the present invention, a pair of twist limits for any given configuration within the cone can be interpolated at runtime. For example, the joint sinus cone 515 is shaded to represent the twist limits on each point. Darker shades indicate a more restrictive limit range. Further derails of refining and smoothing the curve are described in Jane Wilhelms, et al., "Fast and easy reach-cone joint limits," Journal of Graphics Tools, vol. 6, no. 2, pp. 27-41, 2001, which is incorporated by reference herein its entirety.

Joint cone components can be used to check for legal joint configurations and project illegal orientations back to the boundary curve C. A joint cone component is attached to one specific joint, for example, joint j. It takes as input the transformation matrix $T_{input}$ of j, which is produced by rotation components. $T_{input}$ transforms the vector $v_{rest}$ 605 to $v_{input}$ 610 to test if the bone's orientation is within the joint cone. If it is, $T_{input}$ is passed out of the joint cone component. Otherwise, a new transformation matrix $T_{adjusted}$ is computed by using $T_{input}$ so that $v_{input}$ 610 is transformed to $v_{adjusted}$ 615. One skilled in the art will note that the line segment connecting $v_{input}$ 610 and $v_{rest}$ 605 intersects the boundary of the cone at $v_{adjusted}$ 615. Using $v_{adjusted}$ 615, rotation angles α (for first DOF of the joint) and β (for second DOF of the joint) from the rotation components can be newly calculated to produce the adjusted rotation matrix $T_{adjusted}$.

Figure 12:
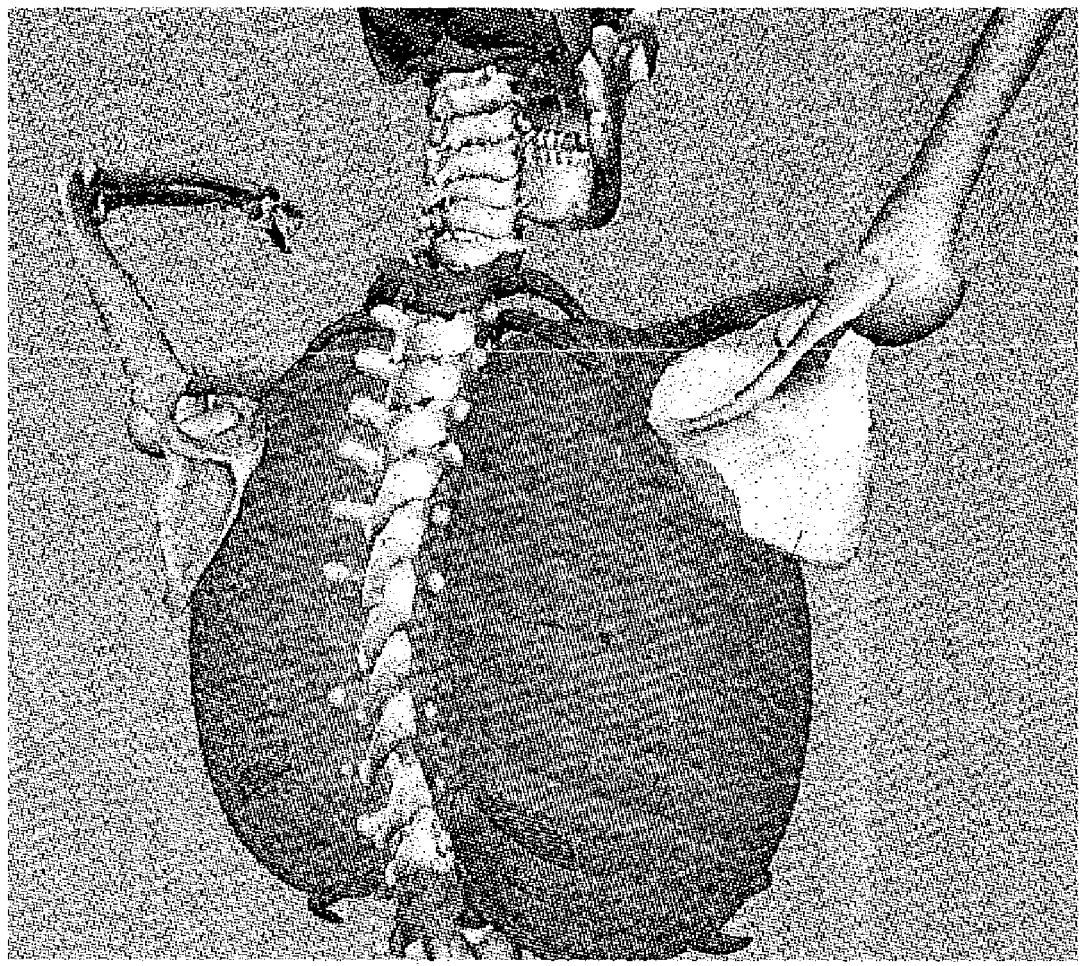
FIG. 12 is a diagram illustrating ellipsoids to constrain the scapulo-thoracic joint according to one embodiment of the present invention.

In one embodiment of the present invention, the scapula constraint component addresses the specific situation of the scapulo-thoracic constraint in the shoulder. The scapula constraint component illustrates one example of how the component framework of the present invention can be extended for special handling of an individual joint. The scapula bone 210 glides on a curved surface defined by ribs, muscles and fatty structures. To represent this in the joint component model, a conventional ellipsoidal constraint can be used. A description of the ellipsoid constraint can be found, for example, in B. Garner, "A kinematic model of the upper limb based on the visible human project (vhp) image dataset," Computer Methods in Biomechanical and Biomedical Engineering vol. 2, pp. 107-124, 1999, which is Incorporated by reference herein in its entirety. As shown in FIG. 12, however one embodiment of the present invention uses two ellipsoids instead of conventionally using only one ellipsoid, with one ellipsoid for each side of the rib cage. This allows the constraints on both sides of the rib cage to be maintained properly as the spine is twisted or laterally bent.

Figure 7:
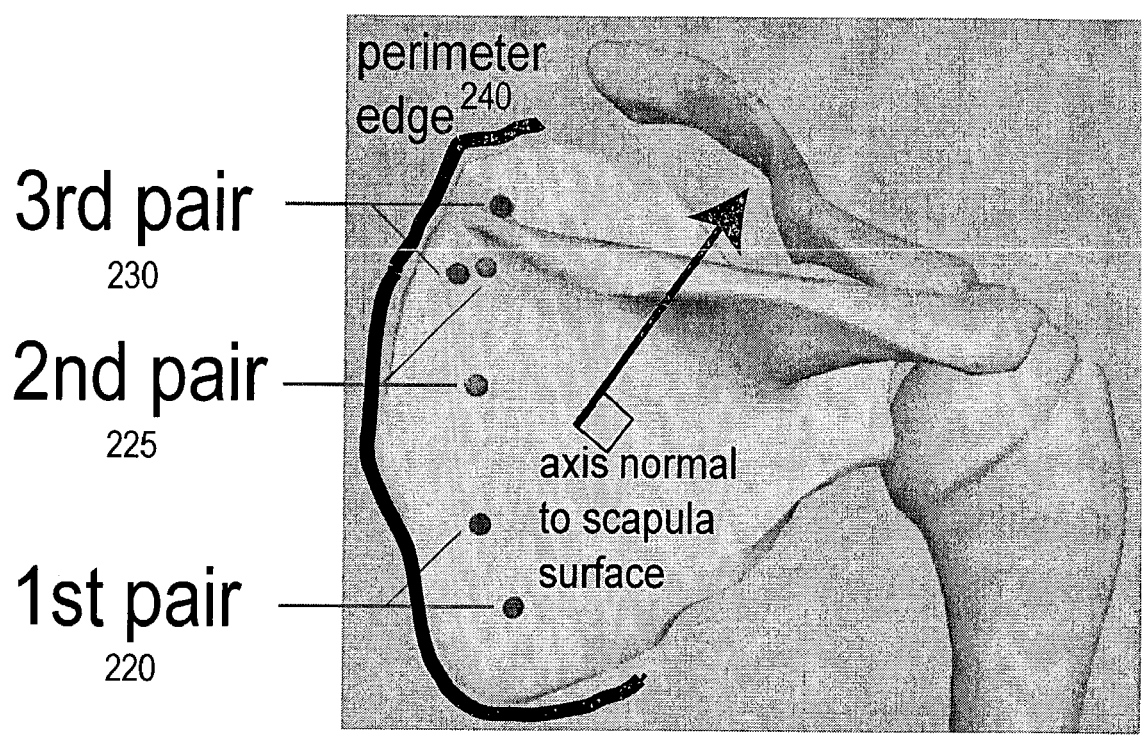
FIG. 7 is a diagram illustrating reference points on a scapula bone in accordance with one embodiment of the present invention.

FIG. 7 is a diagram illustrating reference points on a scapula bone in accordance with one embodiment of the present invention. To constrain the scapula 210 to be gliding on the surface of an ellipsoid, pairs of reference points on the scapula 210 are defined, ensuring that at least one active pair stays on the ellipsoid at all times.

Using the example illustration of FIG. 7, determination of the DOF for the scapula 210 are now described. Consider the scapula 210 as an initially free joint with three DOF for rotation and three DOF for translation. Because the scapula 210 is attached to the parent clavicle 205, the three DOF of translation are determined by its shared attachment point with the clavicle 205. The rotation of the scapula 210 around an axis perpendicular to its flat surface is further constrained, using a dependency component, to be dependent on the abduction of the humerus 215. This dependency constraint removes another DOF. The ellipsoidal constraint determines the remaining two DOF of rotation. By constraining a pair of reference points on the scapula to the ellipsoid's surface, the configuration of scapula bone can be fully determined.

Referring to the embodiment of the present invention illustrated in FIG. 7, pairs of reference points 220, 225, 230 are defined to lie near the perimeter edge 240 of the scapula 210. Having several pairs of reference points 220, 225, 230 allows the contact area between the scapula 210 and rib cage to change depending on other joints in the shoulder. The area close to the 1st pair 220 is more likely to be in contact with the rib cage when the shoulder is lifted. The 2nd pair 225 is more likely to be in contact when the shoulder is lowered. The 3rd pair 230 is active when the scapula 210 is fully rotated clockwise around the axis normal to its surface. Therefore, these three pairs of reference points 220, 225, 230 are used to find a new contact pair by interpolating over two DOFs corresponding to the amount of shoulder lift and rotation about the scapula 210.

The scapula 210 can then be rotated twice to constrain these contact points on the surface of the ellipsoid. In the first rotation, a predefined vector $x_1$ going through the joint origin is used as the rotation axis. Rotation of an angle $\theta$ around $x_1$ brings the first reference point 220 onto the ellipsoid surface. In the second rotation, the vector connecting the joint origin and the first reference point 220 is used as the rotation axis, $x_2$. Similarly, rotation of an angle $\psi$ around $x_2$ brings the second point 225 onto the ellipsoid. One skilled in the art will note that the second rotation does not change the position of the first contact point because it is on the rotation axis $x_2$. In one embodiment of the present invention, binary search is used to find both rotation angles $\theta$ and $\psi$.

Although it is generally desirable in embodiments of the present invention to create joint components that can be reused, the ability to create specialized constraints can be useful to create tailored, intuitive parameters to simplify the description of complex articulations unique to a particular joint. Of course, more biomechanical detail can be added to a joint component as deemed necessary for the application.

D. Constructing Joint Component Models

Figure 8:
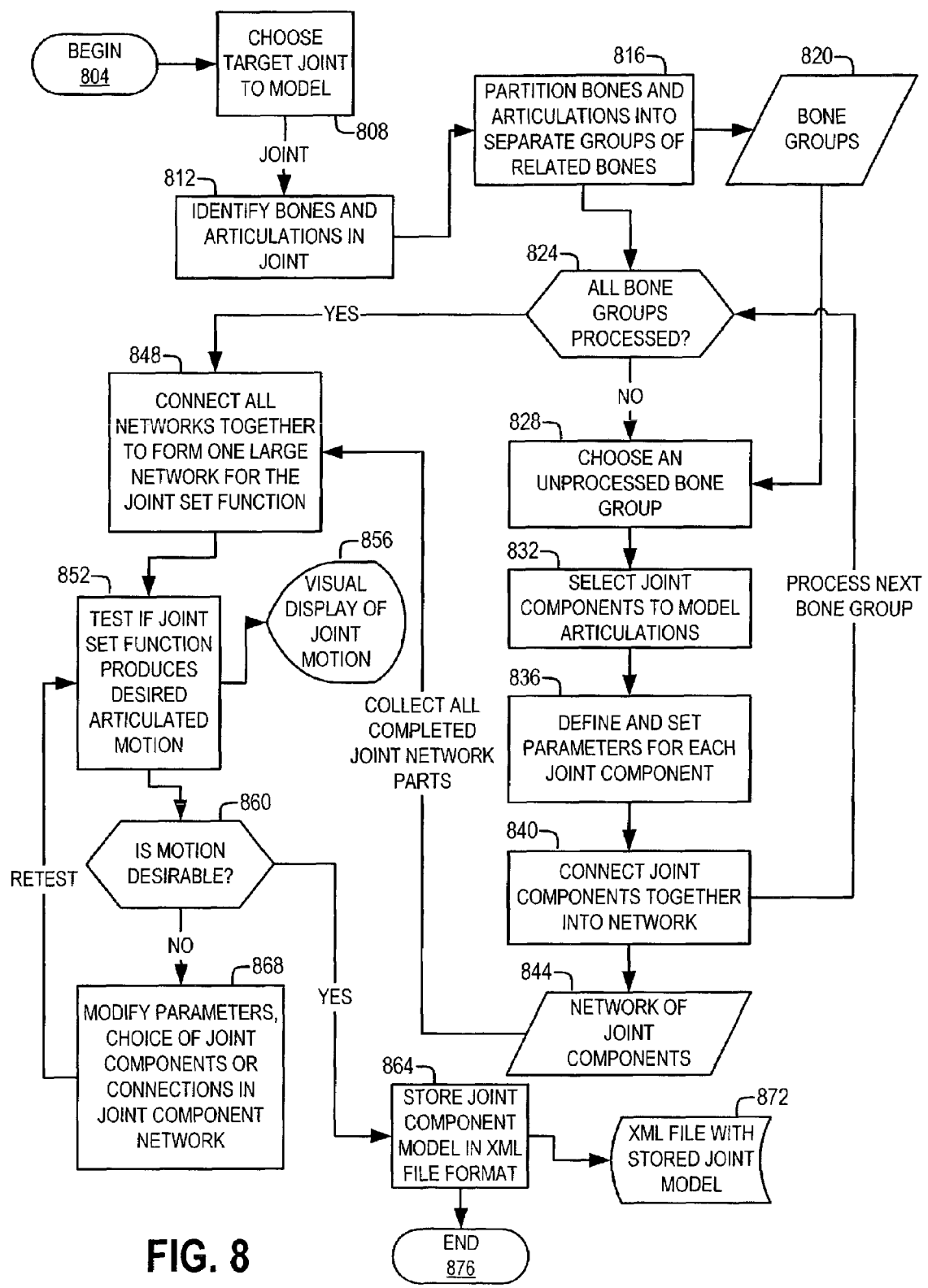
FIG. 8 is a flow diagram for building a joint model according to one embodiment of the present invention.

Having described several example joint components, a process for connecting them into a network to construct joint set functions 105 for the segments of a skeleton is now described. FIG. 8 is a flow diagram for building a joint model according to one embodiment of the present invention. In one embodiment of the present invention, a joint builder performs the illustrated process. The joint builder can be a human being that combines the input and output of the joint components 110, 112, 114, 116, 118, 120, 122 to form the joint set function 105. The joint builder defines which of the joint components 110, 112, 114, 116, 118, 120, 122 are included in the joint set function 105 and how those components are coupled and configured to produce the desired articulated motion.

The illustrated process begins 804 with choosing 808 a target joint to model. Bones and articulations are then identified 812 for the chosen joint. The process then partitions 816 bones and articulations into separate groups of related bones to generate a set of bone groups 820. The bone groups 820 are then processed iteratively. The bone groups 820 can also be processed concurrently or in different orders as known to one of skill in the art.

At the beginning of the loop in the iterative example, a determination 824 is made whether all bone groups 820 have been processed. If all bone groups 820 have not been processed, an unprocessed bone group 820 is chosen 828. Joint components are selected 832 to model the articulations identified 812. To configure the selected 832 joint components, the parameters for each joint component are defined and set 836. Next, the selected joint components are connected 840 into a network. One technique for coupling or connecting the selected joint components is passing the input and the output data values from one joint component to the next joint component until each of the selected joint components are networked 844.

The process then returns to determining 824 whether all bone groups 820 have been processed. If all bone groups 820 have not been processed, the process repeats steps 828, 832, 836, and 840 as described above. If all bone groups 820 have been processed, the process proceeds to connect 848 all completed joint networks 844 to form a large network for the joint set function 105. The joint set function 105 is then tested 852 to determine whether the desired articulated motion is produced. One technique for testing 852 the joint set function 105 is visual display 856 of the joint motion. The joint builder can then decide 860 if the joint set function 105 accurately represents the identified 812 articulations. Visual display 856 of the joint motion can also include the joint builder adjusting a slider, manipulator, or other user interface control (e.g., specifying a range of values) to test 852 the joint motion.

If the joint motion is not desirable, then the joint builder can modify 868 the parameters, choice of joint components, or couplings in the joint component network. The process then retests 852 the joint set function 105. If the joint motion is desirable, the joint component model can be stored 864 in a data file 872. After storing 864 the joint component model, the process ends 876. One skilled in the art will recognize that data file 872 can be a database record or other file type in any appropriate format.

In one embodiment of the present invention, joint component models are stored 864 in extensible markup language (XML) file format. XML format can be an efficient and convenient way of providing ease of interchange among software environments or application software packages. One example XML formatted joint component model is provided below in the Appendix. In the example, the joint components 110, 112, 114, 116, 118, 120, 122 include tags and parameters.

E. Computing System

Figure 9:
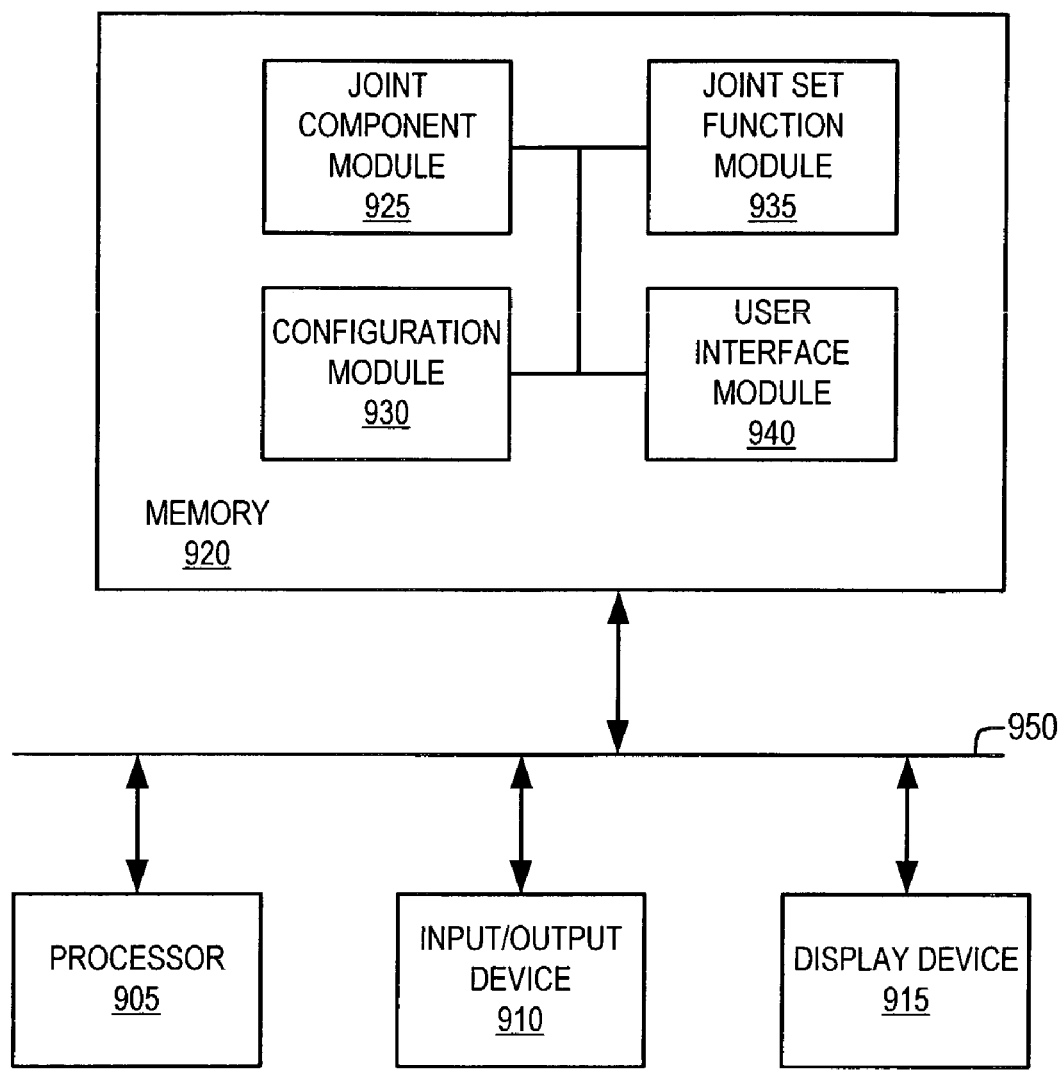
FIG. 9 is a block diagram of a computing device according to one embodiment of the present invention.
Figure 10:
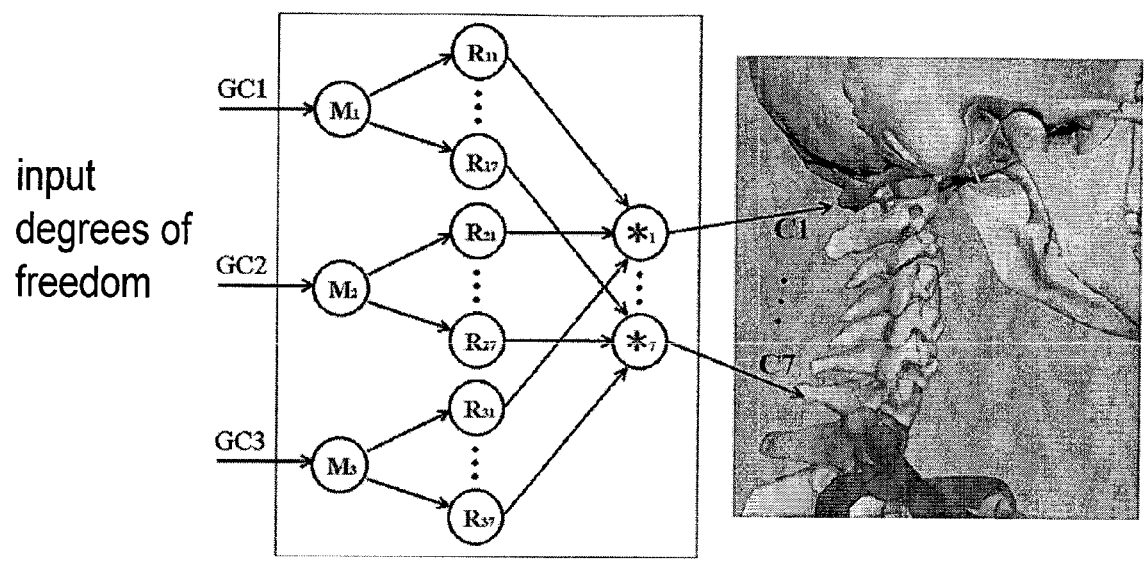
FIG. 10 is a diagram illustrating an exemplary joint function of a cervical joint set according to one embodiment of the present invention.

FIG. 9 is a block diagram of a computing device according to one embodiment of the present invention. In the illustration, there is shown a computing device including a processor 905, an input/output device 910, a display device 915, and a memory 920. The processor 905, the input/output device 910, the display device 915, and the memory 920 are each coupled via a bus 950. The processor 905 can be a conventional microprocessor, for example, a Pentium IV processor, which is commercially available from Intel Corp., Santa Clara, Calif. The input/output device 910 is conventional and permits the computing device to communicate with other computing devices, networks, and peripheral devices, for example. The display device 915 is a conventional monitor or television, for example. The display device 915 enables a user, joint builder, or other developer to interface with functional modules in the memory 920.

The memory 920 can be a conventional memory device, for example, random access memory (RAM), read only memory (ROM), a fixed media, or a removable media (e.g., a diskette, a compact disc ROM (CD-ROM), a compact disc recordable disc (CD-R/W), or a digital versatile disc (DVD)).

The memory 920 includes a number of functional modules: a joint component module 925, a configuration module 930, a joint set function module 935, and a user interface module 940. Exemplary functionality for each of these modules 925, 930, 935, 940 is now described in further detail.

The joint component module 925 includes program instructions and/or data for implementing the joint components 110, 112, 114, 116, 118, 120, 122. More specifically, the joint component module 925 performs calculations and data manipulations for the matrix multiplication component, the one-to-many mapping component, the compensation component, the rotation component, the dependency component, the joint cone component, and the scapula constraint component.

The configuration module 930 includes program instructions and/or data for configuring the parameters of the joint components 110, 112, 114, 116, 118, 120, 122 and for networking the joint components into the joint set function 105. The configuration module 930 can interface with each of the joint component module 925, the joint set function module 935, and the user interface module 940.

The joint set function module 935 includes program instructions and/or data for implementing one or more joint set functions 105. The joint set function module 935 receives the joint set function inputs 130 (e.g., generalized coordinates or degrees of freedom) as input and provides transformation matrices for segments of the joint set 140 as output.

The user interface module 940 includes program instructions and/or data for receiving and for processing user, developer, or joint builder input. For example, the user interface module 940 can presents a display to the user that the user can use to manipulate the jet set function inputs 130.

One skilled in the art will recognize that other functional units or modules can be used to implement the features or functionality of the present invention. That is, the functional units shown in FIG. 9 are merely one example of the organization of the memory 920. For example, functionality of the joint component module can be distributed among a plurality of computing devices using conventional distributed computing techniques.

F. Example Results

Example component frameworks are now described for two complex joints: the spine and the shoulder. To produce the following example results, initial estimates of parameter data for the joints were determined from literature on joint physiology, such as I. Kapandji, "The Physiology of the Joints: The Trunk and the Vertebral Column, 2d ed., vol. 3, Churchill Livingstone, 1982, and I. Kapandji, "The Physiology of the Joints: Upper Limb, 1st ed., vol. 1, Churchill Livingstone, 1982, both of which are incorporated by reference herein in their entireties.

The joint model including joint components 110, 112, 114, 116, 118, 120, 122 and corresponding joint set functions 105 can be implemented as program code modules using the C++ programming language. The program code modules can be adapted for use as plug-ins for the Maya 3-D modeling software, which is commercially available from Alias/Wavefront of Toronto, Ontario, Canada. The Maya environment provides interactive placement of the bones and adjustment of joint parameters. Maya's advanced modeling environment allows articulation of joint sets to be evaluated interactively or visually. The parameters for the joint components can be exported in an XML-based file format that can be loading into other tools, including an OpenGL-based application software. In one embodiment of the present invention, the OpenGL-based application software can accept as input a joint component model described in an XML-based file format and build the joint component network described therein. Once the network is built, the joint model is displayed with 3-D graphics using OpenGL and the joint model can be manipulated by adjusting generalized coordinates with an input device (e.g., a mouse). In one embodiment of the present invention, the OpenGL-based application software can be used to test the interchangeability of the XML-based joint model between software environments. A conventional Intel Pentium II 933 MHz general-purpose computer with Nvidia GeForce4 graphics hardware can achieve interactive display rates with Maya.

1. Spine

There are twenty-four movable vertebrae in the spine of a human. According to their position and functionality, they are divided into three joint sets: the cervical region (seven vertebrae in the neck), the thoracic region (twelve vertebrae in the thorax), and the lumbar region (five vertebrae in the abdomen). For the thoracic joint group, all the ribs and the sternum are included in the joint model to create the rib cage. For all three spine joint sets, the same type of joint function is used. The difference between them is the joint parameters given for each joint group, where the amount of rotation in the thoracic vertebrae is considerably less than the cervical and lumbar regions.

In the illustration, the cervical joint set has seven joints (C1-C7) as well as seven bones (including both the vertebrae and the discs between any two vertebrae). Each joint alone has three DOF of rotation and thus has three rotation components. Rotation axes and rotation centers are estimated from I. Kapandji, "The Physiology of the Joints: The Trunk and the Vertebral Column, 2d ed., vol. 3, Churchill Livingston; 1982 for each rotation component. The three rotation components for a single joint may have different rotation centers and non-orthogonal rotation axes. A pair of joint limit angles defined by a one-to-many mapping component Is provided to bound each of the rotations. Because rotation behavior of the vertebrae in the spine are coupled together, movement control is simplified to have only three DOF: flexion/extension, lateral-bending, and twisting along the vertebra axis. These DOF are illustrated as inputs of generalized coordinates GC1, GC2, and GC3. In each joint set of the spine, a one-to-many mapping component first converts the input DOF to a rotation angle for each vertebra in the joint set. The one-to-many mapping components are identified as $M_n$, rotation components are identified as $R_n$, and matrix multiplication components are identified as For example, in the cervical region, the flexion/extension maps to the following angle rotation ranges (in degrees) for the seven vertebrae: C7 [−13.2,5.5], C6 [−7.5,5.5], C5[−4, 5.5], C4[−4.6,5.5],C3[−8,6.5],C2[−5.5,6.5],C1[−18.5,6.5]. The conversion is a linear map between [−1,11]and a pair of vertebra-specific angle limits [min, max]. Each angle is then sent to a specific rotation component $R_n$ for the vertebra to which it corresponds. The output matrices of the rotation components for each DOF are directed into a matrix multiplication component $*_n$ to generate the final transformation for the vertebrae C1 through C7.

The implementation of joint set functions for the thoracic and lumbar are similar to the cervical vertebrae with the exception that the thoracic group contains ribs attached to each vertebra. Because the rib cage creates a closed chain with the spine and sternum, it tends to resist thoracic spine movement that otherwise causes the individual ribs to rotate away or into each other during lateral bending. The rotation of a rib can be set by parameters to be dependent on the amount of motion of its attached thoracic vertebra to maintain the overall shape of the rib cage. Intuitively, one skilled in the art will appreciate that the ribs are rotated in a direction opposite to that of the spine's rotation with the ribs rotating less than spine. Therefore, the axes of ribs can defined to be opposite to those for vertebrae and the axes of the ribs can have smaller rotational limits. One skilled in the art will note that for more accurate deformations of the rib cage, a custom joint component can be designed for the joint component model of the present invention.

In this example of a spine model, each joint set has three DOF of rotation for flexion/extension, lateral bending, and twist, making a total of nine DOF to control the entire spine and the rib cage. This is considerably fewer DOF than the total number of articulations achievable in our model because various dependencies are built into the model implicitly. The fewer DOF provide a lightweight and intuitive control mechanism, which balances accuracy with control simplicity.

2. Shoulder

The shoulder includes four articulations (the scapulo-humeral joint 260, the acromio-clavicular joint 255, the sterno-clavicular joint 250, and the sliding scapulo-thoracic joint 265). Several bones are involved in these joints: the clavicle 205, scapula 210, humerus 215, sternum and rib cage. In addition to the bone articulations, ligaments, cartilage and muscles also can play important roles in the shoulder to create coupling behavior and dependencies among the shoulder's joints.

A shoulder joint model was built that includes the four joints and three bones. Its joint set function has five DOF, of which three control the scapulo-humeral joint 260 (flexion/extension, abduction/adduction and twist of the humerus 215) and two control the sterno-clavicular joint 250 (vertical and horizontal rotation of the clavicle 205). The acromio-clavicular joint 255 has zero controllable DOF because its movement can be fully determined by movements of the other two joints and the ellipsoidal surface constraint with the rib cage. The joint set function 105 outputs three transformation matrices 140 for the three joints respectively. Inside, the joint set function 105 has three parts, each in charge of one joint.

Figure 11A:
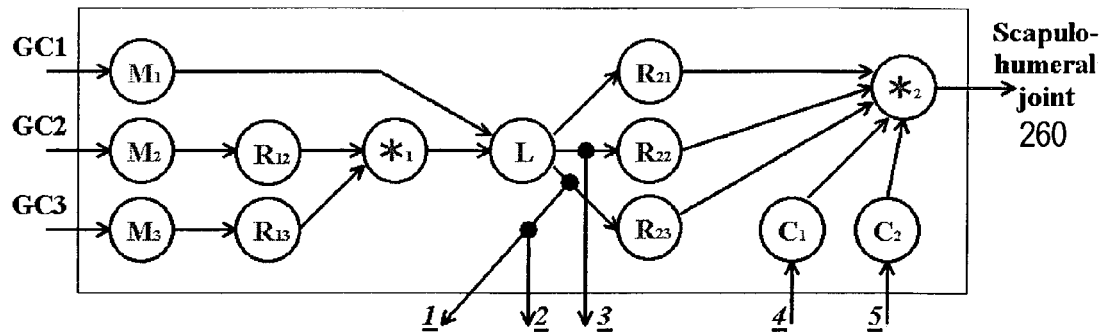
FIGS. 11A-11C are diagrams illustrating an exemplary joint function of a shoulder joint set according to one embodiment of the present invention.

FIG. 11A illustrates a first portion of the joint set function 105 that produces the transformation matrix 140 for controlling the scapulo-humeral joint 260. Each control input 130 goes first through a one-to-many mapping component $M_n$ at which time it is converted to an angle in the range of [−180, 180]. The two angles of flexion/extension and abduction/adduction are sent into two rotation components $R_{12}$ and $R_{13}$ to create their rotation matrices. For the right arm abduction/adduction, the rotation component has two intervals, [0,60] and [60,180] degrees, with rotation centers in the humerus local coordinate system of (−0.373, −0.247, −0.181) and (−0.373, 0.449, −0.181) respectively. One skilled in the art will appreciate that these coordinates can depend on the measurement units, bone geometry, and local coordinate systems of the segments used to represent the skeleton model. These coordinates can therefore vary between different models.

The combined result of these two matrices, together with the twist angle, then go through a joint cone component, identified as L in FIG. 11A, to produce a final valid orientation matrix. Two compensation components $C_1$ and $C_2$ can be used to compensate for movements from both the parent joint and grandparent joint of scapulo-humeral joint 260. Their inputs are the final outputs of the other two function parts (identified as 4 and 5), which are described below. By multiplying compensation matrices and the final rotation matrices together, we get the final transformation of the scapulo-humeral joint 260.

Figure 11B:
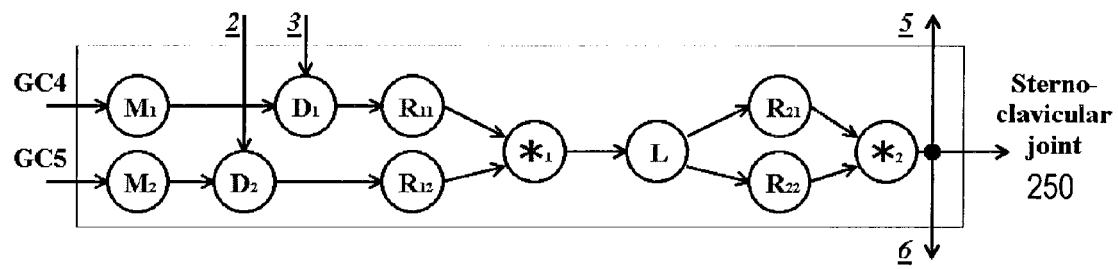

FIG. 11B illustrates a second portion of the joint set function 105 that produces the transformation matrix 140 for controlling the sterno-clavicular joint 250. Each input DOF 130 goes through a one-to-many mapping component $M_n$ and gets converted to an angle. The two angles, together with two angles of the scapulo-humeral joint 260 (identified as 2 and 3), are sent as input into two dependency components $D_1$ and $D_2$ because the rotation angles of the clavicle 205 partially depend on those of the upper arm as further described above. For example, in the right shoulder, a piecewise linear function maps the humerus abduction/adduction angles of 0, 60, 120, 180 degrees to the clavicle elevation angles of −10, −6.7, 4.85, and 23 degrees respectively. Rotation components $R_{11}$ and $R_{12}$ construct matrices using the outputs from dependency components $D_1$ and $D_2$ and the combined result gets tested in a joint cone component L. Its output provides the final transformation to control the sterno-clavicular joint 250.

Figure 11C:
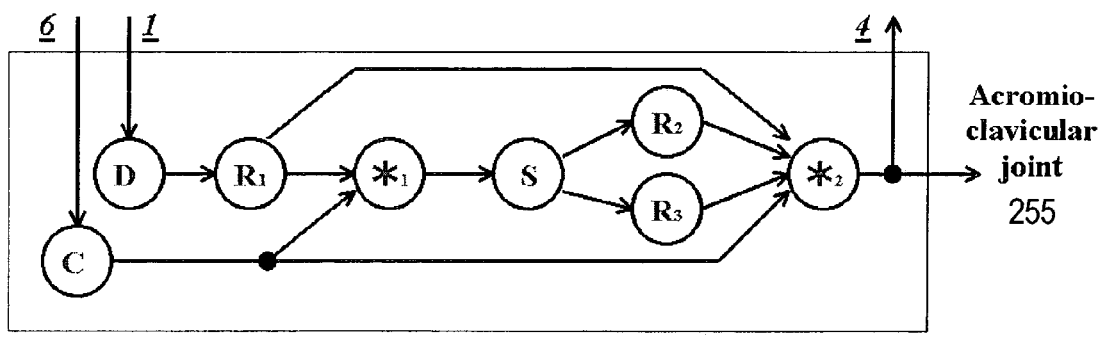

FIG. 11C illustrates a third portion of the joint set function 105 that produces the transformation matrix 140 for controlling the acromio-clavicular joint 255. Its inputs (identified 1 and 6) are from the other two portions described above. The first portion provides the abduction angle of the upper arm, which decides, through a dependency component D and a rotation component $R_1$, the rotation of the scapula 210 around the axis normal to its flat surface. The second portion provides the transformation of the stemro-clavicular joint 250, which is used by the compensation component C to compute the compensation matrix. Then the scapula constraint component S uses the combined results to produce another two angles. For the right shoulder, the initial local axis of rotation on the scapula was (0.263, −0.912, 0.314). The three pairs of reference points 220, 225, 230 on the scapula 210 in its local coordinates are (8.5, −4, −0.3) with (8.7,−2.4,−0.1), (8.2,0,−0.1) with (7.5,2,0), and (8,2,−0.8) with (7,3,−0.6) respectively. Rotation components $R_2$ and $R_3$ use the two angles to rotate the scapula onto the surface of an ellipsoid that is fixed in the sternum's frame of reference. Finally, the three rotation matrices and the compensation matrix are multiplied together to produce the final transformation to control the acromio-clavicular joint 255.

One skilled in the art will recognize that the three functional portions illustrated in FIGS. 11A-11C are tightly coupled together. It is not possible to compute any of them completely independently of the others. This is because the computation of the first portion depends on the final results of the other two portions, which need intermediate results from the first portion as their inputs. A conventional topological order is used, however, for these computations over the whole network of these three portions, allowing the joint function to be serially computed with no danger of deadlock.

A component joint model in accordance with one embodiment of the present invention includes a simple control interface, and the joint components can be computed for real-time interactive applications using conventional computing devices. The component joint model can be used to produce realistic joint movements. A joint designer or builder is enabled through the framework to consider different competing criteria such as desired level of detail, joint parameter design, and computational complexity to develop suitable models for the desired target application.

One skilled in the art will appreciate that due to the complexity of several joint set functions 105, it may not always be possible to compute their analytic derivatives for inverse kinematics or gradient-based optimization. However, as the joint set functions 105 produce deterministic joint transformations, finite difference techniques can be used to estimate their derivatives. An embodiment of the framework can also be used to find subject-specific parameters that enable the same joint set functions 105 to be customized for different individuals or animals. The joint components described above do not represent a complete set for modeling all joints at every level of accuracy. In particular, through the design of new components or new joint sets, various other joint models can be incorporated into the framework of the present invention.

Having described embodiments of joint component framework for modeling complex joint behavior (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

APPENDIX

```
<!-- ++++++++++++++ Joint Map ++++++++++++++ -->
<jointmap type="shoulder" name="l_shd">
    <!-- ++++++++++++++ Input GC ++++++++++++++ -->
    <gc name="l_shd_shd_flx" init="0" low="-1" high="1"/>
    <gc name="l_shd_shd_elv" init="0" low="-1" high="1"/>
    <gc name="l_shd_arm_tws" init="0" low="-1" high="1"/>
    <gc name="l_shd_arm_flx" init="0" low="-1" high="1"/>
    <gc name="l_shd_arm_abd" init="0" low="0" high="1"/>
    <!-- ++++++++++++++ ################################################
++++++++++++++ -->
        <!-- ++++++++++++++ Scapulo-Humeral joint part ++++++++++++++ -->
        <!-- ++++++++++++++ Mapping of arm_twist ++++++++++++++ -->
        <component name="l_sca_hum_map_x" inputcount="1" outputcount="1">
            <input index="1" type="gc" from="l_shd_arm_tws"/>
            <mapping type="Linear" outputtype="degrees" output="1">
                <point x="-1" y="-180"/>
                <point x="1" y="180"/>
            </mapping>
        </component>
        <!-- ++++++++++++++ Mapping of arm_flexion ++++++++++++++ -->
        <component name="l_sca_hum_map_y" inputcount="1" outputcount="1">
            <input index="1" type="gc" from="l_shd_arm_flx"/>
            <mapping type="Linear" outputtype="degrees" output="1">
                <point x="-1" y="-175"/>
                <point x="1" y="175"/>
            </mapping>
        </component>
        <!-- ++++++++++++++ Mapping of arm_abduction ++++++++++++++ -->
        <component name="l_sca_hum_map_z" inputcount="1" outputcount="1">
            <input index="1" type="gc" from="l_shd_arm_abd"/>
            <mapping type="Linear" outputtype="degrees" output="1">
                <point x="0" y="0"/>
                <point x="1" y="180"/>
            </mapping>
        </component>
        <!-- ++++++++++++++ Rotation of arm_abduction ++++++++++++++ -->
        <component name="l_sca_hum_rot_z" inputcount="1" outputcount="1">
            <input index="1" type="angle" from="l_sca_hum_map_z" fromindex="1"/>
            <rotation axis="-0.235 0 0.972" outputtype="matrix" output="1">
```

APPENDIX-continued

```
            <interval ge="0.0" le="60.0" rotcenter="0.373 -0.247 -0.181"/>
            <interval gt="60.0" le="180.0" rotcenter="0.373 0.449 -0.181"/>
        </rotation>
    </component>
    <!-- ++++++++++++++ Rotation of arm_flexion ++++++++++++++ -->
    <component name="l_sca_hum_rot_y" inputcount="1" outputcount="1">
        <input index="1" type="angle" from="l_sca_hum_map_y" fromindex="1"/>
        <rotation axis="0 1 0" outputtype="matrix" output="1">
            <interval ge="-360.0" le="360.0" rotcenter="0.541 0 -0.399"/>
        </rotation>
    </component>
    <!-- ++++++++++++++ Mult of arm_abduction and arm_flexion
++++++++++++++ -->
    <component name="l_sca_hum_mult_yz" inputcount="2" outputcount="1">
        <input index="1" type="matrix" from="l_sca_hum_rot_z" fromindex="1"/>
        <input index="2" type="matrix" from="l_sca_hum_rot_y" fromindex="1"/>
        <multiplication order="2 1" outputtype="matrix" output="1"/>
    </component>
    <!-- ++++++++++++++ jointcone of the arm ++++++++++++++ -->
    <component name="l_sca_hum_jointcone" inputcount="2" outputcount="3">
        <input index="1" type="matrix" from="l_sca_hum_mult_yz" fromindex="1"/>
        <input index="2" type="angle" from="l_sca_hum_map_x" fromindex="1"/>
        <jointcone type="degree3" flexion="1" abduction="2" twist="3"
            subdivisionlevel="3" apex="1.2 -10 -0.5">
            <visiblepoint vector="10 0 2.5" twistlimit="0 0"/>
            <sample point="-3 -10 -4" twistlimit="0 0"/>
            <sample point="-2 -12 -8" twistlimit="0 0"/>
            <sample point="2 -13 -10" twistlimit="0 0"/>
            <sample point="12 -10 -13" twistlimit="0 0"/>
            <sample point="11 3 -8" twistlimit="0 0"/>
            <sample point="3 13 -6" twistlimit="0 0"/>
            <sample point="-0.5 16 -3" twistlimit="0 0"/>
            <sample point="-1 16 2" twistlimit="0 0"/>
            <sample point="-7 16 8" twistlimit="0 0"/>
            <sample point="-9 5 11" twistlimit="0 0"/>
            <sample point="-8 -3 14" twistlimit="0 0"/>
            <sample point="-4 -8 10" twistlimit="0 0"/>
            <sample point="-2 -10 7" twistlimit="0 0"/>
            <sample point="-1 -10 0" twistlimit="0 0"/>
        </jointcone>
    </component>
    <!-- ++++++++++++++ Final rotation of arm_abduction ++++++++++++++ -->
    <component name="l_sca_hum_rot_z_final" inputcount="1" outputcount="1">
        <input index="1" type="angle" from="l_sca_hum_jointcone" fromindex="2"/>
        <rotation axis="-0.235 0 0.972" outputtype="matrix" output="1">
            <interval ge="0.0" le="60.0" rotcenter="0.373 -0.247 -0.181"/>
            <interval gt="60.0" le="180.0" rotcenter="0.373 0.449 -0.181"/>
        </rotation>
    </component>
    <!-- ++++++++++++++ Final rotation of arm_flexion ++++++++++++++ -->
    <component name="l_sca_hum_rot_y_final" inputcount="1" outputcount="1">
        <input index="1" type="angle" from="l_sca_hum_jointcone" fromindex="1"/>
        <rotation axis="0 1 0" outputtype="matrix" output="1">
            <interval ge="-360.0" le="360.0" rotcenter="0.541 0 -0.399"/>
        </rotation>
    </component>
    <!-- ++++++++++++++ Final rotation of arm_twist ++++++++++++++ -->
    <component name="l_sca_hum_rot_x_final" inputcount="1" outputcount="1">
        <input index="1" type="angle" from="l_sca_hum_jointcone" fromindex="3"/>
        <rotation axis="0.972 0 0.235" outputtype="matrix" output="1">
            <interval ge="-360.0" le="360.0" rotcenter="0 0 -0.536"/>
        </rotation>
    </component>
    <!-- ++++++++++++++ Compensation for clavicle ++++++++++++++ -->
    <component name="l_sca_hum_compn_clv" inputcount="1" outputcount="1">
        <input index="1" type="matrix" from="l_stn_clv_mult_final" fromindex="1"/>
        <compensation outputtype="matrix" output="1" ancestor="l_sternoclavicular"
child="l_shoulder"/>
    </component>
    <!-- ++++++++++++++ Compensation for scapula ++++++++++++++ -->
    <component name="l_sca_hum_compn_sca" inputcount="1" outputcount="1">
        <input index="1" type="matrix" from="l_acr_clv_mult_final" fromindex="1"/>
        <compensation outputtype="matrix" output="1" ancestor="l_acromioclavicular"
child="l_shoulder"/>
    </component>
    <!-- ++++++++++++++ Final multiplication of Scapulo-Humeral joint part
++++++++++++++ -->
    <component name="l_sca_hum_mult_final" inputcount="5" outputcount="1">
        <input index="1" type="matrix" from="l_sca_hum_rot_x_final" fromindex="1"/>
```

APPENDIX-continued

```xml
            <input index="2" type="matrix" from="l_sca_hum_rot_y_final" fromindex="1"/>
            <input index="3" type="matrix" from="l_sca_hum_rot_z_final" fromindex="1"/>
            <input index="4" type="matrix" from="l_sca_hum_compn_sca" fromindex="1"/>
            <input index="5" type="matrix" from="l_sca_hum_compn_clv" fromindex="1"/>
            <multiplication order="4 5 2 3 1" outputtype="matrix" output="1"/>
        </component>
        <!-- ++++++++++++++ ############################################## +++++++++++++++ -->
        <!-- ++++++++++++++ Sterno-Clavicular joint part +++++++++++++++ -->
        <!-- ++++++++++++++ Mapping of shd_flexion +++++++++++++++ -->
        <component name="l_stn_clv_map_x" inputcount="1" outputcount="1">
            <input index="1" type="gc" from="l_shd_shd_flx"/>
            <mapping type="PiecewiseLinear" outputtype="degrees" output="1">
                <point x="-1" y="-20"/>
                <point x="0" y="0"/>
                <point x="1" y="30"/>
            </mapping>
        </component>
        <!-- ++++++++++++++ Mapping of shd_elevation +++++++++++++++ -->
        <component name="l_stn_clv_map_y" inputcount="1" outputcount="1">
            <input index="1" type="gc" from="l_shd_shd_elv"/>
            <mapping type="PiecewiseLinear" outputtype="degrees" output="1">
                <point x="-1" y="-20"/>
                <point x="0" y="0"/>
                <point x="1" y="30"/>
            </mapping>
        </component>
        <!-- ++++++++++++++ Dependency of shd_elevation on humerus_abduction +++++++++++++++ -->
        <component name="l_stn_clv_dep_y" inputcount="2" outputcount="1">
            <input index="1" type="angle" from="l_sca_hum_rot_z_final" fromindex="1"/>
            <input index="2" type="angle" from="l_stn_clv_map_y" fromindex="1"/>
            <dependency outputtype="degrees" input="2" output="1">
                <mapping input="1" type="lowerbound" interpolation="PiecewiseLinear">
                    <points x="0" y="-10"/>
                    <points x="60" y="-6.7"/>
                    <points x="120" y="4.85"/>
                    <points x="180" y="23"/>
                </mapping>
            </dependency>
        </component>
        <!-- ++++++++++++++ Dependency of shd_flexion on humerus_flexion +++++++++++++++ -->
        <component name="l_stn_clv_dep_x" inputcount="2" outputcount="1">
            <input index="1" type="angle" from="l_sca_hum_rot_y_final" fromindex="1"/>
            <input index="2" type="angle" from="l_stn_clv_map_x" fromindex="1"/>
            <dependency outputtype="degrees" input="2" output="1">
                <mapping input="1" type="lowerbound" interpolation="PiecewiseLinear">
                    <points x="0" y="-13"/>
                    <points x="90" y="0.8"/>
                    <points x="180" y="14.6"/>
                </mapping>
                <mapping input="1" type="upperbound" interpolation="PiecewiseLinear">
                    <points x="-180" y="-6.1"/>
                    <points x="-90" y="7.7"/>
                    <points x="0" y="21.5"/>
                </mapping>
            </dependency>
        </component>
        <!-- ++++++++++++++ Rotation of shd_flexion +++++++++++++++ -->
        <component name="l_stn_clv_rot_x" inputcount="1" outputcount="1">
            <input index="1" type="angle" from="l_stn_clv_dep_x" fromindex="1"/>
            <rotation axis="0.985 0.035 0.17" outputtype="matrix" output="1">
                <interval ge="-360.0" le="360.0" rotcenter="0 0 0"/>
            </rotation>
        </component>
        <!-- ++++++++++++++ Rotation of shd_elevation +++++++++++++++ -->
        <component name="l_stn_clv_rot_y" inputcount="1" outputcount="1">
            <input index="1" type="angle" from="l_stn_clv_dep_y" fromindex="1"/>
            <rotation axis="0 1 0" outputtype="matrix" output="1">
                <interval ge="-360.0" le="360.0" rotcenter="0 0 0"/>
            </rotation>
        </component>
        <!-- ++++++++++++++ Multiplication of shd_flexion and shd_elevation +++++++++++++++ -->
        <component name="l_stn_clv_mult_xy" inputcount="2" outputcount="1">
            <input index="1" type="matrix" from="l_stn_clv_rot_x" fromindex="1"/>
            <input index="2" type="matrix" from="l_stn_clv_rot_y" fromindex="1"/>
            <multiplication order="2 1" outputtype="matrix" output="1"/>
```

APPENDIX-continued

```xml
    </component>
    <!-- ++++++++++++++ jointcone of the clavicle ++++++++++++++ -->
    <component name="l_stn_clv_jointcone" inputcount="1" outputcount="2">
        <input index="1" type="matrix" from="l_stn_clv_mult_xy" fromindex="1"/>
        <jointcone type="degree2" flexion="1" abduction="2"
            subdivisionlevel="4" apex="14.062 0.5 2.43">
            <visiblepoint vector="14 6.3 4" twistlimit="0 0"/>
            <sample point="14 -2.5 4" twistlimit="0 0"/>
            <sample point="14 2 -0.5" twistlimit="0 0"/>
            <sample point="14 6.5 4" twistlimit="0 0"/>
            <sample point="14 2 8.5" twistlimit="0 0"/>
        </jointcone>
    </component>
    <!-- ++++++++++++++ Final rotation of shd_flexion ++++++++++++++ -->
    <component name="l_stn_clv_rot_x_final" inputcount="1" outputcount="1">
        <input index="1" type="angle" from="l_stn_clv_jointcone" fromindex="1"/>
        <rotation axis="0.985 0.035 0.17" outputtype="matrix" output="1">
            <interval ge="-360.0" le="360.0" rotcenter="0 0 0"/>
        </rotation>
    </component>
    <!-- ++++++++++++++ Final rotation of shd_elevation ++++++++++++++ -->
    <component name="l_stn_clv_rot_y_final" inputcount="1" outputcount="1">
        <input index="1" type="angle" from="l_stn_clv_jointcone" fromindex="2"/>
        <rotation axis="0 1 0" outputtype="matrix" output="1">
            <interval ge="-360.0" le="360.0" rotcenter="0 0 0"/>
        </rotation>
    </component>
    <!-- ++++++++++++++ Final multiplication of shd_flexion and shd_elevation
++++++++++++++ -->
    <component name="l_stn_clv_mult_final" inputcount="2" outputcount="1">
        <input index="1" type="matrix" from="l_stn_clv_rot_x_final" fromindex="1"/>
        <input index="2" type="matrix" from="l_stn_clv_rot_y_final" fromindex="1"/>
        <multiplication order="2 1" outputtype="matrix" output="1"/>
    </component>
    <!-- ++++++++++++++ ############################################
++++++++++++++ -->
    <!-- ++++++++++++++ Acromio-Clavicular joint part ++++++++++++++ -->
    <!-- ++++++++++++++ Compensation for clavicle ++++++++++++++ -->
    <component name="l_acr_clv_compn_clv" inputcount="1" outputcount="1">
        <input index="1" type="matrix" from="l_stn_clv_mult_final" fromindex="1"/>
        <compensation outputtype="matrix" output="1" ancestor="l_sternoclavicular"
child="l_acromioclavicular"/>
    </component>
    <!-- ++++++++++++++ Dependency of acromio-clavicular joint part
++++++++++++++ -->
    <component name="l_acr_clv_dep" inputcount="1" outputcount="1">
        <input index="1" type="angle" from="l_sca_hum_rot_z_final" fromindex="1"/>
        <dependency outputtype="degrees" input="1" output="1">
            <mapping input="1" type="one-to-one" interpolation="PiecewiseLinear">
                <points x="0" y="-5"/>
                <points x="60" y="16.6"/>
                <points x="120" y="38.2"/>
                <points x="180" y="67"/>
            </mapping>
        </dependency>
    </component>
    <!-- ++++++++++++++ Final Z rotation of acromio-clavicular
++++++++++++++ -->
    <component name="l_acr_clv_rot_z_final" inputcount="1" outputcount="1">
        <input index="1" type="angle" from="l_stn_clv_dep" fromindex="1"/>
        <rotation axis="-0.549 -0.172 0.818" outputtype="matrix" output="1">
            <interval ge="-360.0" le="360.0" rotcenter="0 0 0.5"/>
        </rotation>
    </component>
    <!-- ++++++++++++++ Multiplication of scapula_z and compensation
++++++++++++++ -->
    <component name="l_acr_clv_mult" inputcount="2" outputcount="1">
        <input index="1" type="matrix" from="l_acr_clv_rot_z" fromindex="1"/>
        <input index="2" type="matrix" from="l_acr_clv_compn_clv" fromindex="1"/>
        <multiplication order="2 1" outputtype="matrix" output="1"/>
    </component>
    <!-- ++++++++++++++ Special constaint of acromio-clavicular joint part
++++++++++++++ -->
    <component name="l_acr_clv_special" inputcount="1" outputcount="1">
        <input index="1" type="matrix" from="l_acr_clv_mult" fromindex="1"/>
        <scapulaconstraint output="1" type="matrix">
            <rotation round="1" pivot="0 0 0" axis="0.263 0.912 -0.314" contactpoint1="-
8.5 -4 -0.3" contactpoint2="-8.2 0 -0.1" contactpoint3="-8 2 -0.8"/>
            <rotation round="2" pivot="0 0 0" contactpoint1="-8.7 -2.4 -0.1"
```

APPENDIX-continued

```
contactpoint2="-7.5 2 0" contactpoint3="-7 3 -0.6"/>
        <ellipsoid parent="sternum" translation="6.031 -0.631 -8.526"
rotation="28.648 -22.932 -2.644" scaling="8.631 13.464 7.443"/>
      </scapulaconstraint>
    </component>
    <!-- ++++++++++++++ Final multiplication of acromio-clavicular
++++++++++++++ -->
    <component name="l_acr_clv_mult_final" inputcount="3" outputcount="1">
      <input index="1" type="matrix" from="l_acr_clv_rot_x_final" fromindex="1"/>
      <input index="2" type="matrix" from="l_acr_clv_special" fromindex="1"/>
      <input index="3" type="matrix" from="l_acr_clv_compn_clv" fromindex="1"/>
      <multiplication order="3 2 1" outputtype="matrix" output="1"/>
    </component>
    <!-- ++++++++++++++ ################################################
++++++++++++++ -->
    <!-- ++++++++++++++ Output matrices of l_shd ++++++++++++++ -->
    <segmentmatrix target="l_shoulder" from="l_sca_hum_mult_final"
fromindex="1"/>
    <segmentmatrix target="l_acromioclavicular" from="l_acr_clv_mult_final"
fromindex="1"/>
    <segmentmatrix target="l_sternoclavicular" from="l_stn_clv_mult_final"
fromindex="1"/>
  </jointmap>
```

What is claimed is:

1. A computer-readable medium encoded with instructions which, when executed by a computer, cause the computer to determine a transformation matrix based on a joint component model, the joint component model representing joint expressions over a plurality of bone segments, the model comprising:

a first joint component including an input, an output, and a parameter, the first joint component configured to map the input to the output using a first mathematical function, wherein the mapping is controlled by the parameter;

a second joint component including an input and an output, the second joint component configured to map the input to the output using a second mathematical function; and a joint set function including a network of the first joint component and the second joint component, the joint set function having a joint set function input and a joint set function output, the joint set input configured to provide a control for a user, the joint set output configured to provide a transformation matrix for manipulating a bone segment of the plurality of bone segments, wherein, if the bone segment has one or more parent segments, the transformation matrix is unequal to a product of transformation matrices of joints of the one or more parent segments, wherein the joint set function includes a rotation component wherein the rotation component is configured to model a changing joint center of rotation that provides a first joint center of rotation for a first angle interval and a second joint center of rotation for a second angle interval.

2. A computer-readable medium encoded with instructions which, when executed by a computer, cause the computer to determine a transformation matrix based on a joint component model, the joint component model representing joint expressions over a plurality of bone segments, the model comprising:

a first joint component including an input, an output, and a parameter, the first joint component configured to map the input to the output using a first mathematical function, wherein the mapping is controlled by the parameter;

a second joint component including an input and an output, the second joint component configured to map the input to the output using a second mathematical function; and a joint set function including a network of the first joint component and the second joint component, the joint set function having a joint set function input and a joint set function output, the joint set input configured to provide a control for a user, the joint set output configured to provide a transformation matrix for manipulating a bone segment of the plurality of bone segments, wherein, if the bone segment has one or more parent segments, the transformation matrix is unequal to a product of transformation matrices of joints of the one or more parent segments, wherein the joint set function includes a scapula constraint component wherein the scapula constraint component includes two ellipsoids configured to constrain the scapula bone using pairs of reference points.

3. A computer-readable medium encoded with instructions which, when executed by a computer, cause the computer to determine a transformation matrix based on a joint component model, the joint component model representing joint expressions over a plurality of bone segments, the model comprising:

a first joint component including an input, an output, and a parameter, the first joint component configured to map the input to the output using a first mathematical function, wherein the mapping is controlled by the parameter;

a second joint component including an input and an output, the second joint component configured to map the input to the output using a second mathematical function; and a joint set function including a network of the first joint component and the second joint component, the joint set function having a joint set function input and a joint set function output, the joint set input configured to provide a control for a user, the joint set output configured to provide a transformation matrix for manipulating a bone segment of the plurality of bone segments, wherein, if the bone segment has one or more parent segments, the transformation matrix is unequal to a product of transformation matrices of joints of the one or more parent segments, wherein the joint set function includes a joint cone component wherein the joint cone component is configured to generate a boundary curve and to project an invalid orientation back to the boundary curve, wherein the invalid orientation is due to rotation with a changing joint center providing a first joint center of rotation for a first angle interval and a second joint center of rotation for a second angle interval.

4. A method for determining a transformation matrix for a segment of a joint, the method comprising:

selecting a first joint component comprising a first mathematical function including a parameter, wherein the first joint component is configured to provide a first joint center of rotation for a first angle interval and to provide a second joint center of rotation for a second angle interval;

setting the parameter to define behavior of the first joint component;

selecting a second joint component comprising a second mathematical function;

coupling the first joint component and the second joint component to produce a joint set function, wherein the joint set function specifies the transformation matrix;

transforming the segment using the transformation matrix; and either displaying the transformed segment or storing the transformed segment.

5. A method for determining a transformation matrix for a segment of a joint, the method comprising:

selecting a first joint component comprising a first mathematical function including a parameter, wherein the first joint component is configured to constrain a segment using multiple ellipsoids and multiple pairs of reference points;

setting the parameter to define behavior of the first joint component;

selecting a second joint component comprising a second mathematical function;

coupling the first joint component and the second joint component to produce a joint set function, wherein the joint set function specifies the transformation matrix;

transforming the segment using the transformation matrix; and either displaying the transformed segment or storing the transformed segment.

6. A method for determining a transformation matrix for a segment of a joint, the method comprising:

selecting a first joint component comprising a first mathematical function including a parameter, wherein the first joint component is configured to generate a boundary curve and to project an invalid orientation onto the boundary curve, wherein the invalid orientation is due to rotation with a changing joint center providing a first joint center of rotation for a first angle interval and a second joint center of rotation for a second angle interval;

setting the parameter to define behavior of the first joint component;

selecting a second joint component comprising a second mathematical function;

coupling the first joint component and the second joint component to produce a joint set function, wherein the joint set function specifies the transformation matrix;

transforming the segment using the transformation matrix; and either displaying the transformed segment or storing the transformed segment.

7. An apparatus for determining a transformation matrix for a segment of a joint, the apparatus comprising:

means for selecting a first joint component comprising a first mathematical function including a parameter, wherein the first joint component is configured to provide a first joint center of rotation for a first angle interval and to provide a second joint center of rotation for a second angle interval;

means for setting the parameter to define behavior of the first joint component;

means for selecting a second joint component comprising a second mathematical function; and means for coupling the first joint component and the second joint component to produce a joint set function, wherein the joint set function specifies the transformation matrix.

8. An apparatus for determining a transformation matrix for a segment of a joint, the apparatus comprising:

means for selecting a first joint component comprising a first mathematical function including a parameter, wherein the first joint component is configured to constrain a segment using multiple ellipsoids and multiple pairs of reference points;

means for setting the parameter to define behavior of the first joint component;

means for selecting a second joint component comprising a second mathematical function; and means for coupling the first joint component and the second joint component to produce a joint set function, wherein the joint set function specifies the transformation matrix.

9. An apparatus for determining a transformation matrix for a segment of a joint, the apparatus comprising:

means for selecting a first joint component comprising a first mathematical function including a parameter, wherein the first joint component is configured to generate a boundary curve and to project an invalid orientation onto the boundary curve, wherein the invalid orientation is due to rotation with a changing joint center providing a first joint center of rotation for a first angle interval and a second joint center of rotation for a second angle interval;

means for setting the parameter to define behavior of the first joint component;

means for selecting a second joint component comprising a second mathematical function; and means for coupling the first joint component and the second joint component to produce a joint set function, wherein the joint set function specifies the transformation matrix.

* * * * *